United States Patent
Yuan et al.

(10) Patent No.: US 12,532,323 B2
(45) Date of Patent: Jan. 20, 2026

(54) ROBUST DCI BASED FAST BEAM INDICATION

(71) Applicant: QUALCOMM Incorporated, San Diego, CA (US)

(72) Inventors: Fang Yuan, Beijing (CN); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 421 days.

(21) Appl. No.: 17/784,445

(22) PCT Filed: Jan. 10, 2020

(86) PCT No.: PCT/CN2020/071297
§ 371 (c)(1),
(2) Date: Jun. 10, 2022

(87) PCT Pub. No.: WO2021/138882
PCT Pub. Date: Jul. 15, 2021

(65) Prior Publication Data
US 2023/0007681 A1    Jan. 5, 2023

(51) Int. Cl.
*H04W 72/00* (2023.01)
*H04L 1/1812* (2023.01)
(Continued)

(52) U.S. Cl.
CPC .......... *H04W 72/23* (2023.01); *H04L 1/1812* (2013.01); *H04L 5/0053* (2013.01)

(58) Field of Classification Search
CPC .... H04W 72/23; H04L 1/1812; H04L 5/0053; H04L 1/1822; H04L 1/1854; H04L 1/1887
See application file for complete search history.

(56) References Cited

U.S. PATENT DOCUMENTS 12,177,864 B2 * 12/2024 Go ...................... H04B 7/0691
2018/0302889 A1   10/2018 Guo et al.
(Continued)

FOREIGN PATENT DOCUMENTS

CN           110535592 A      12/2019

OTHER PUBLICATIONS

International Search Report and Written Opinion—PCT/CN2020/071297—ISA/EPO—Oct. 12, 2020.
(Continued)

*Primary Examiner* — John D Blanton
(74) *Attorney, Agent, or Firm* — QUALCOMM Incorporated

(57) ABSTRACT

A user equipment (UE) and a base station may utilize downlink control information (DCI) based beam indication to switch beams for wireless communications. The base station may transmit and the UE may receive on a control beam for a control resource set (CORESET), a downlink control information (DCI) that includes a transmission configuration indicator (TCI) and schedules a transmission between the UE and the base station. The UE and the base station may communicate the scheduled transmission. The UE and the base station may determine an acknowledgment of the DCI based on the scheduled transmission. The UE and the base station may switch the control beam for the CORESET based on the TCI after a time offset from the acknowledgment.

24 Claims, 13 Drawing Sheets

(51) Int. Cl.
*H04L 5/00* (2006.01)
*H04W 72/23* (2023.01)

(56) References Cited

U.S. PATENT DOCUMENTS

| | | | | |
|---|---|---|---|---|
| 2019/0215701 | A1* | 7/2019 | Honglei | H04B 7/0617 |
| 2019/0222289 | A1* | 7/2019 | John Wilson | H04B 7/0626 |
| 2019/0268118 | A1 | 8/2019 | Sadiq et al. | |
| 2019/0313389 | A1 | 10/2019 | John Wilson et al. | |
| 2019/0349065 | A1* | 11/2019 | Zhang | H04B 7/088 |
| 2020/0029274 | A1* | 1/2020 | Cheng | H04W 76/28 |
| 2020/0169446 | A1* | 5/2020 | Chen | H04L 5/001 |
| 2020/0221455 | A1* | 7/2020 | Lei | H04W 72/0446 |
| 2020/0245333 | A1* | 7/2020 | Lin | H04L 1/0026 |
| 2020/0260358 | A1* | 8/2020 | Ratnam | H04B 7/024 |
| 2020/0280409 | A1* | 9/2020 | Grant | H04L 5/0044 |
| 2021/0058113 | A1* | 2/2021 | Jung | H04B 7/0695 |
| 2021/0184809 | A1 | 6/2021 | Zhou et al. | |
| 2021/0376985 | A1* | 12/2021 | Zhou | H04L 1/1812 |
| 2022/0116171 | A1* | 4/2022 | Zhang | H04L 5/0094 |
| 2022/0116177 | A1 | 4/2022 | Shi | H04W 72/23 |
| 2022/0263696 | A1* | 8/2022 | Shin | H04W 72/1268 |
| 2022/0264615 | A1* | 8/2022 | Kang | H04B 7/024 |
| 2022/0272674 | A1* | 8/2022 | Go | H04B 7/0691 |
| 2022/0278787 | A1* | 9/2022 | Liu | H04W 72/51 |
| 2022/0345195 | A1* | 10/2022 | Jang | H04B 7/0695 |
| 2022/0393801 | A1* | 12/2022 | Lei | H04L 5/0094 |
| 2022/0408470 | A1* | 12/2022 | Jung | H04B 7/0695 |
| 2023/0007681 | A1* | 1/2023 | Yuan | H04L 1/1822 |
| 2024/0031067 | A1* | 1/2024 | Gao | H04L 5/0053 |
| 2024/0250778 | A1* | 7/2024 | Noh | H04L 1/1861 |

OTHER PUBLICATIONS

Intel Corporation: "On TCI State Switch Delay", R4-1900111, 3GPP TSG-RAN WG4 Meeting #90, 3rd Generation Partnership Project (3GPP), Mobile Competence Centre, 650, Route Des Lucioles, F-06921 Sophia-Antipolis Cedex, France, vol. RAN WG4, No. Athens, GR, Feb. 25, 2019-Mar. 1, 2019, Feb. 15, 2019, XP051604948, 5 Pages, pp. 1-4.

QUALCOMM: "Beam Management for NR", 3GPP TSG-RAN WG1 #90bis, R1-1718541, 3rd Generation Partnership Project, Mobile Competence Centre, 650, Route Des Lucioles, F-06921 Sophia-Antipolis Cedex, France, vol. RAN WG1, No. Prague. P.R. Czechia, Oct. 9, 2017-Oct. 13, 2017, Oct. 8, 2017, XP051341723, 3GPP Server Laid Open Date Oct. 3, 2017, 17 Pages, fig. 1+par. 3.1.1, 4., 6.,9, fig. 0-1, Sec. 2.1, Sec. 2.2, Sec. 3, pp. 1-7, the whole document.

Supplementary European Search Report—EP20911490—Search Authority—The Hague—Jul. 20, 2023.

3GPP TS 38.321: "3rd Generation Partnership Project, Technical Specification Group Radio Access Network, NR, Medium Access Control (MAC) Protocol Specification (Release 15)", Technical Specification, 3GPP TS 38.321 V15.7.0, Sep. 27, 2019, pp. 1-77, p. 66.

3GPP TS 38.331: "3rd Generation Partnership Project, Technical Specification Group Radio Access Network, NR, Radio Resource Control (RRC) Protocol Specification (Release 15)", 3GPP TS 38.331 V15.17.0, Mar. 2022, pp. 1-539, pp. 214-215.

SAMSUNG: "New WID: Further Enhancements on MIMO for NR", BGPP TSG RAN Meeting #86, RP-193133, Sitges, Spain, Dec. 9-12, 2019, Dec. 12, 2019, 5 Pages.

* cited by examiner

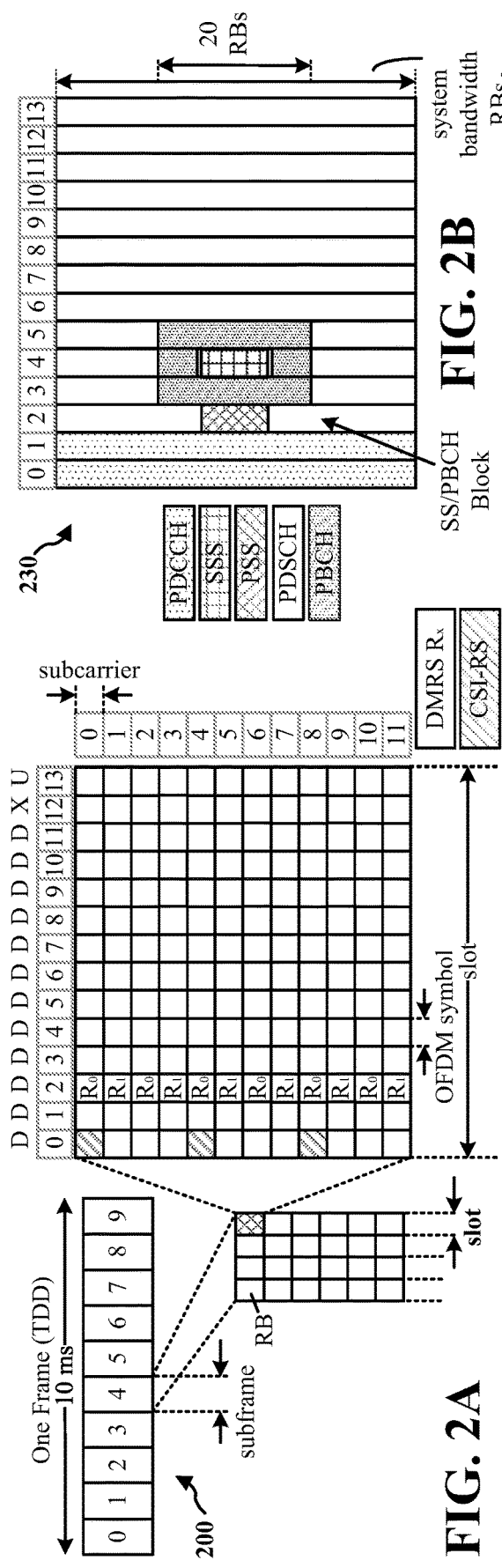
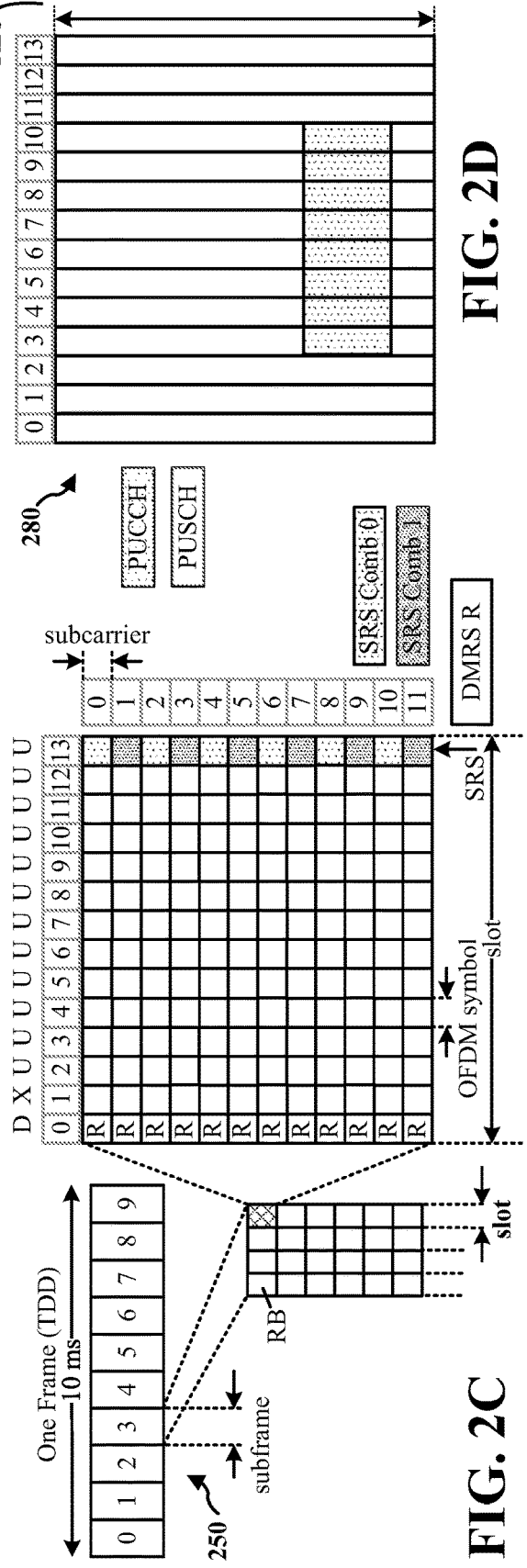

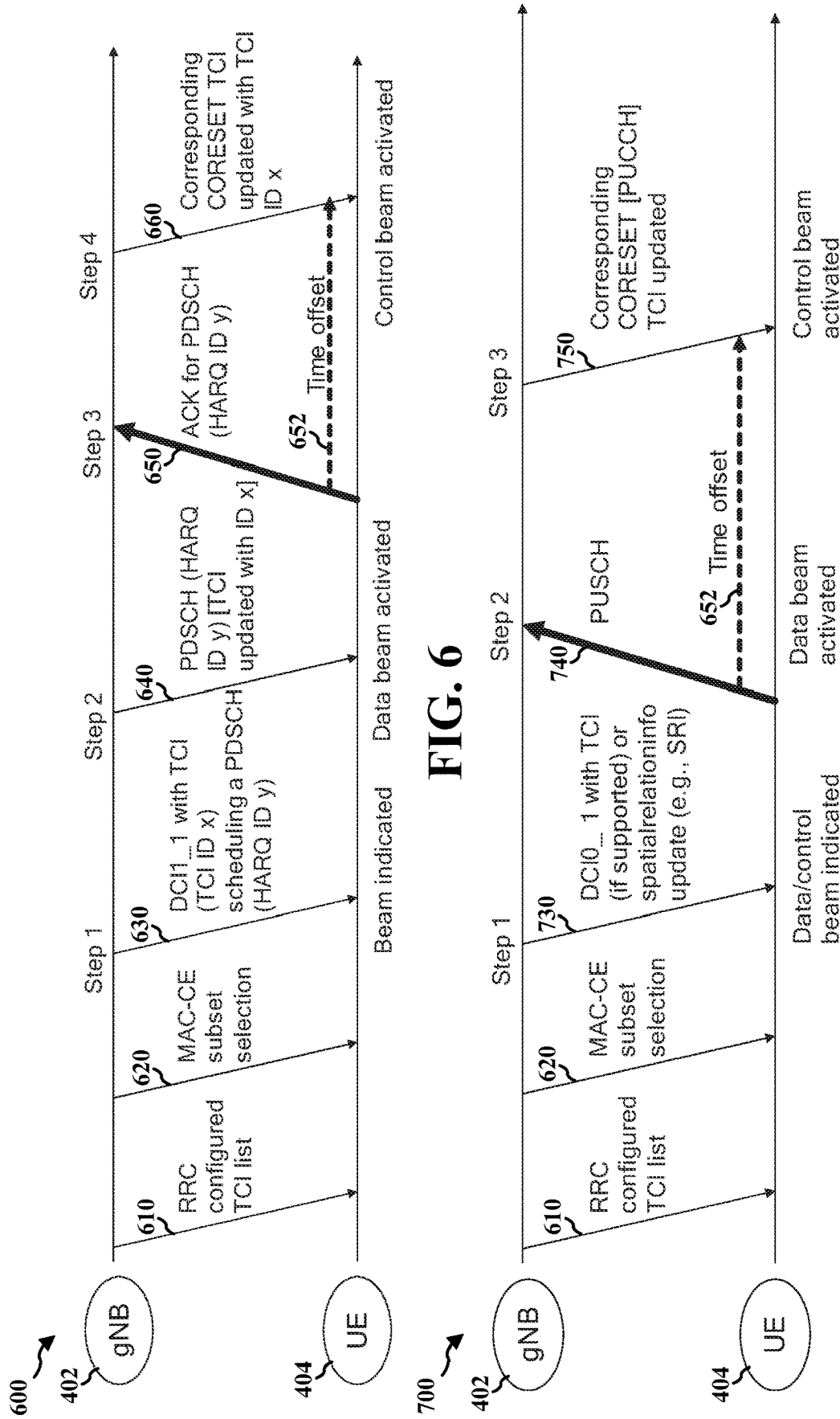

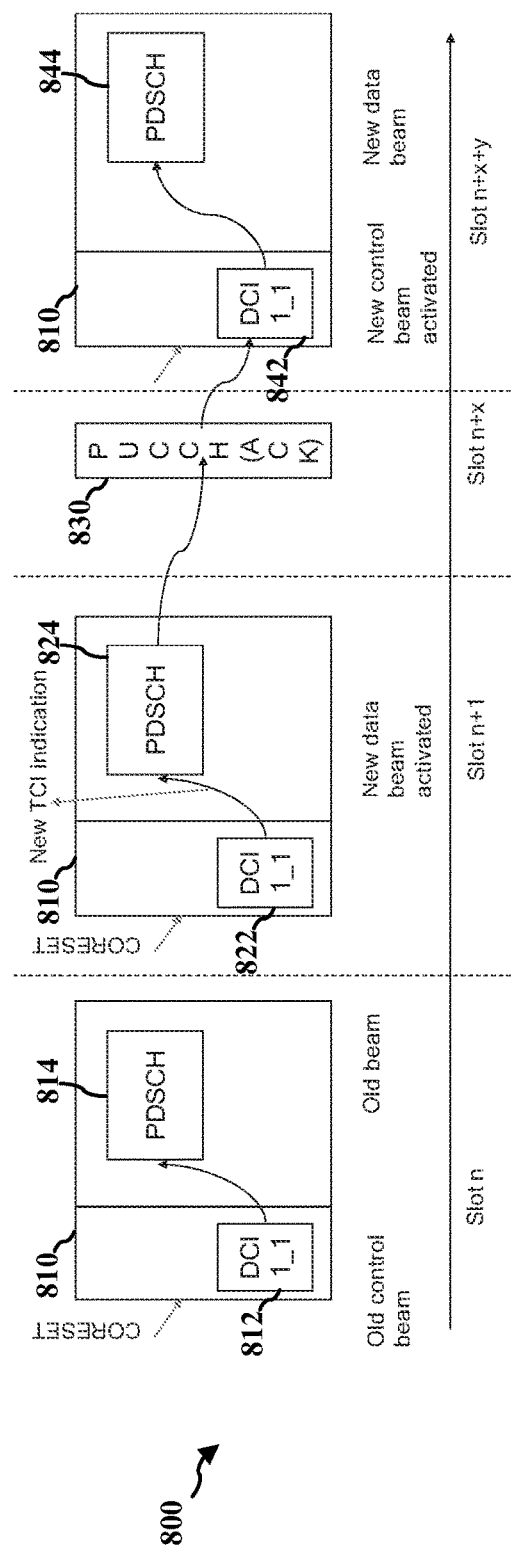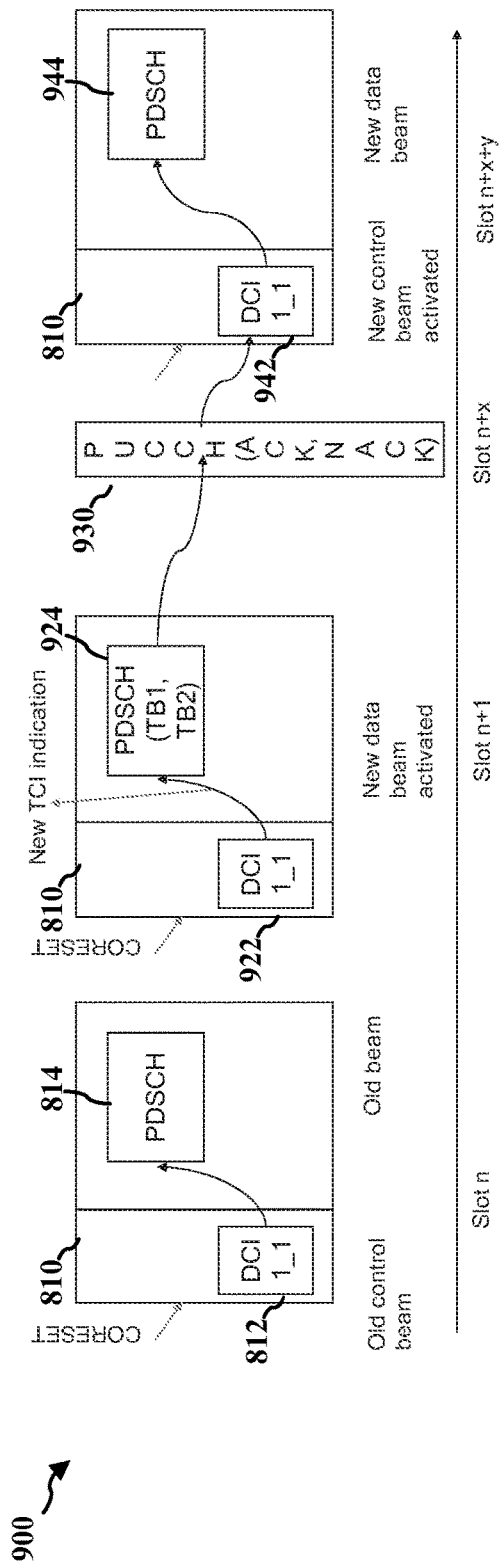
FIG. 8
FIG. 9

ROBUST DCI BASED FAST BEAM INDICATION

CROSS-REFERENCE TO RELATED APPLICATIONS

This application is a 35 U.S.C. § 371 National Phase Application of PCT Application No. PCT/CN2020/071297 filed Jan. 10, 2020, entitled "ROBUST DCI BASED FAST BEAM INDICATION," which is assigned to the assignee hereof.

BACKGROUND

Technical Field

The present disclosure relates generally to communication systems, and more particularly, to beam indication.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The method may include receiving, at a user equipment (UE) using a control beam for a control resource set (CORESET), a downlink control information (DCI) that includes a transmission configuration indicator (TCI) and schedules a transmission between the UE and a base station. The method may include communicating the scheduled transmission. The method may include determining an acknowledgment of the DCI based on the scheduled transmission. The method may include switching the control beam for the CORESET based on the TCI after a time offset from the acknowledgment. The computer readable medium may include computer-executable instructions for performing the method. An apparatus may include a memory and at least one processor configured to perform the method. Another apparatus may include means for performing the method.

Another aspect of the disclosure provides method of wireless communication for a base station. The method may include transmitting, from a base station using a control beam for a control resource set (CORESET) of a user equipment (UE), a downlink control information (DCI) that includes a transmission configuration indicator (TCI) and schedules a transmission between the UE and the base station. The method may include communicating the scheduled transmission. The method may include determining an acknowledgment of the DCI based on the scheduled transmission. The method may include switching the control beam for the CORESET based on the TCI after a time offset from the acknowledgment. A computer readable medium may include computer-executable instructions for performing the method. An apparatus may include a memory and at least one processor configured to perform the method. Another apparatus may include means for performing the method.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 6 is a diagram showing example communications between a base station and a UE for activating a new beam based on an acknowledgment of a downlink transmission scheduled by a DCI.

FIG. 7 is a diagram showing example communications between a base station and a UE for activating a new beam based on an uplink transmission scheduled by a DCI.

FIG. 8 is a diagram showing example messages for activating a new beam based on a DCI scheduling a single physical downlink shared channel (PDSCH).

FIG. 9 is a diagram showing example messages for activating a new beam based on a DCI scheduling a PDSCH including multiple codewords or transport blocks.

DETAILED DESCRIPTION

Figure 1:
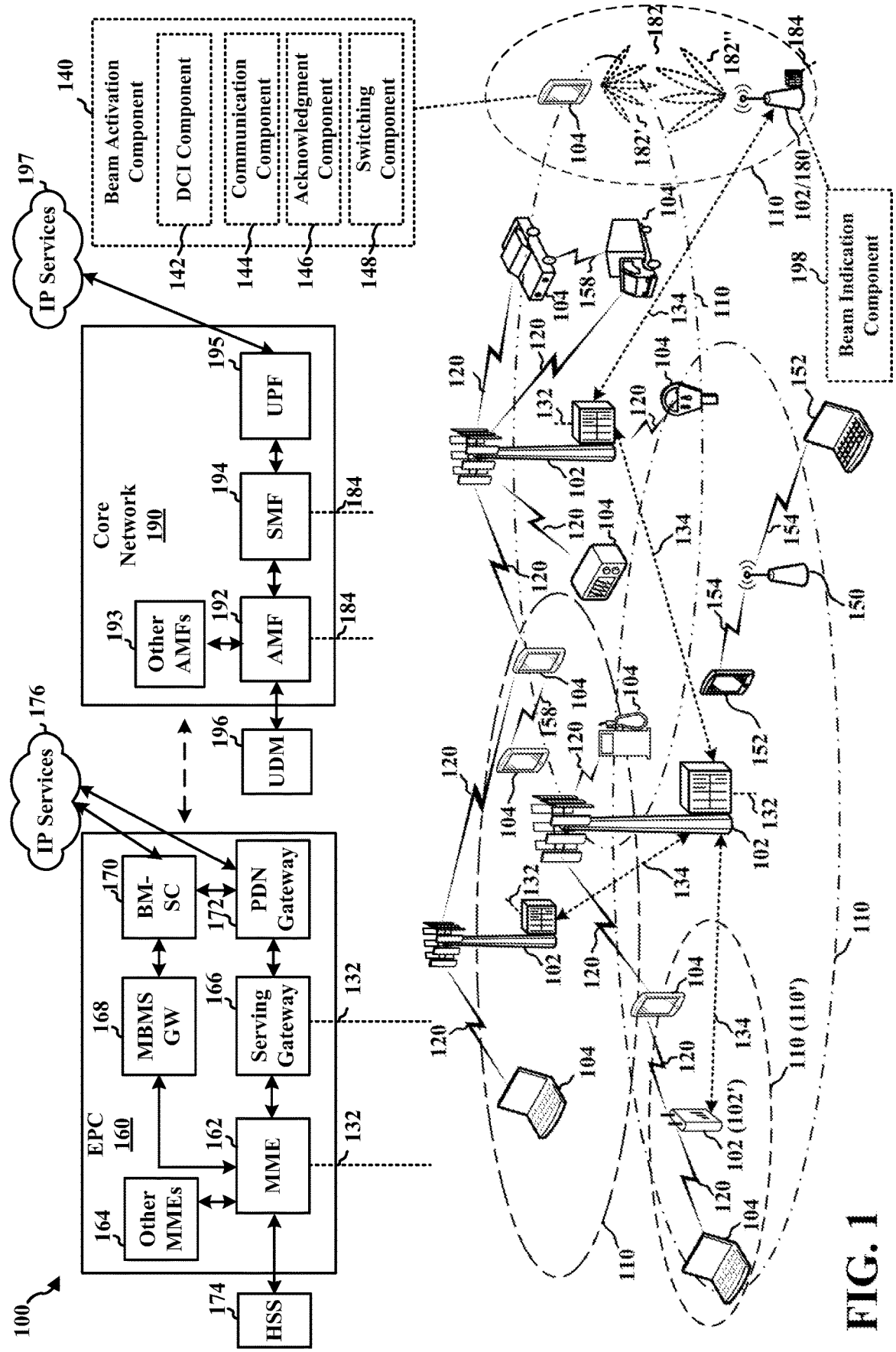
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In a multiple-input and multiple-output (MIMO) system, wireless communications may be transmitted on a directional beam. Different beams may be selected between a user equipment (UE) and a base station to improve the efficiency and reliability of the wireless communications. Some systems may utilize transmission configuration indication (TCI) states to control selection of beams. The number of TCI states and available beams may be limited due to complexities and delays in beam indication.

In an aspect, MIMO communications may be improved by reducing latency of beam switching and lowering overhead of beam indications while maintaining beam indication reliability. For example, both the base station and the UE may switch beams at the same time to utilize corresponding beams.

In an aspect, the present disclosure includes techniques for indicating a beam or TCI state in a downlink control information (DCI) and switching the beam after an acknowledgment based on a scheduled transmission for the DCI. In particular, the DCI may include a TCI indicating a new control beam and also schedule a transmission, which may utilize a new data beam. Because the DCI is subject to blind decoding by the UE and is not protected by hybrid automatic repeat request (HARQ), there may be uncertainty as to whether the UE has received the DCI and is prepared to change beams. Accordingly, the base station may wait until an acknowledgment of the DCI is received to change the control beam. Otherwise, if the base station switches beams and the UE does not switch beams, the UE may have difficulty decoding a DCI transmitted on a control beam that does not correspond to the control beam of the UE.

The acknowledgment of the DCI may be based on the scheduled transmission indicated by the DCI. For downlink transmissions such as a physical downlink shared channel (PDSCH), the DCI may be acknowledged when the UE transmits a positive acknowledgment of the scheduled transmission indicated by the DCI. For uplink transmissions such as a physical uplink shared channel (PUSCH), physical random access channel (PRACH), sounding reference signal (SRS), or channel state information (CSI) report, the uplink transmission may be considered an acknowledgment of the DCI. Both the UE and the base station may switch control beams after a time offset from the acknowledgment of the DCI. The time offset may allow the base station to transmit another DCI scheduling a retransmission of the scheduled transmission in case the acknowledgment of the DCI is not received correctly at the base station. In view of the above, the present disclosure provides for robust DCI based fast beam indication that reduces latency of beam switching while providing reliable beam indication for both the UE and the base station.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE-PROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

In an aspect, one of more of the UEs 104 may include a beam activation component 140 that switches a control beam for a CORESET based on a TCI included in a DCI received at the UE 104. The beam activation component 140 may switch the control beam for the CORESET after a time offset from an end of the transmission of the acknowledgment of the DCI. The beam activation component 140 may include a DCI component 142 that receives the DCI including the TCI and scheduling a transmission between the UE 104 and a base station 102; a communication component 144 that communicates the scheduled transmission; an acknowledgment component 146 that transmits the acknowledgment of the DCI based on the scheduled transmission; and a switching component 148 that switches the control beam for the CORESET based on the TCI after a time offset from the end of the transmission of the acknowledgment.

Figure 18:
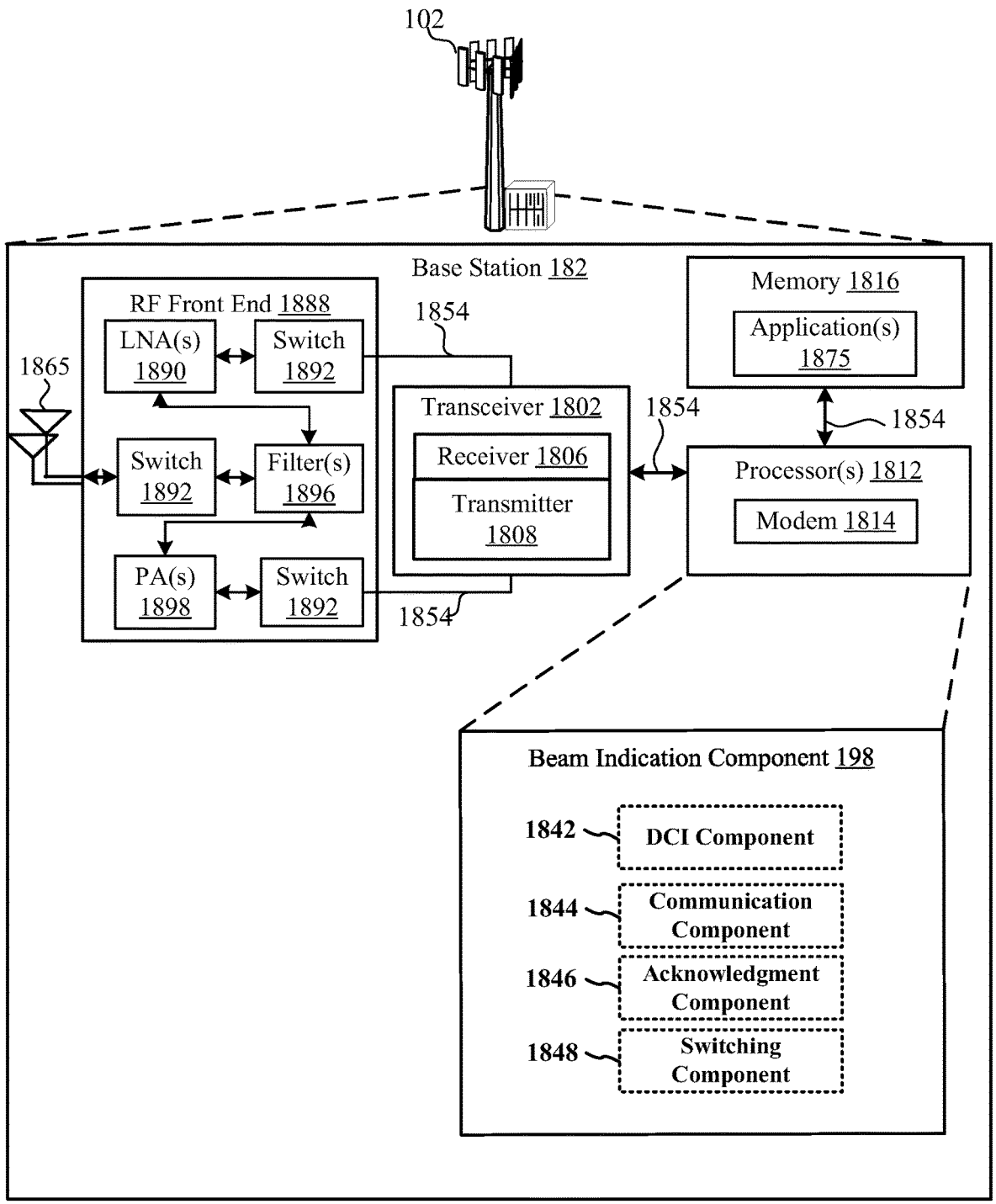
FIG. 18 is a diagram of example components of the base station of FIG. 1.

In an aspect, one or more of the base stations 102 may include a beam indication component 198 that operates in communication with the beam activation component 140 to switch the control beam for the CORESET. As illustrated in FIG. 18, the beam indication component 198 may include a DCI component 1842 that transmits the DCI including the TCI and scheduling a transmission between the UE 104 and the base station 102; a communication component 1844 that communicates the scheduled transmission; an acknowledgment component 1846 that determines the acknowledgment of the DCI based on the scheduled transmission; and a switching component 1848 that switches the control beam for the CORESET based on the TCI after a time offset from the acknowledgment.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface), which may be wired or wireless. The base stations 102 configured for 5G NR (collectively referred to as Next Generation RAN (NG-RAN)) may interface with core network 190 through second backhaul links 184, which may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu 0$ to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
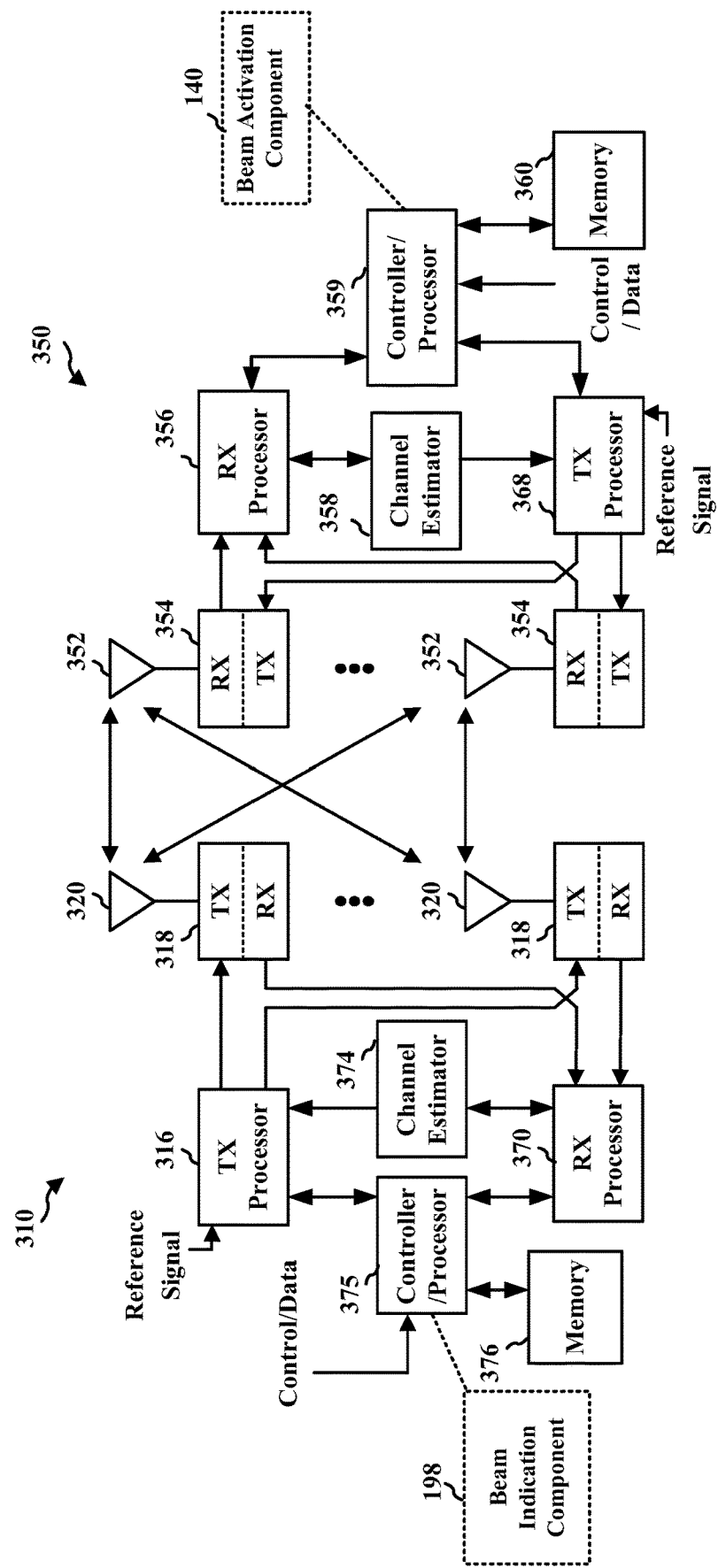
FIG. 3 is a diagram illustrating an example of a base station and a user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the beam activation component 140 of FIG. 1.

At least one of the TX processor 316, the RX processor 370, and the controller/processor 375 may be configured to perform aspects in connection with the beam indication component 198 of FIG. 1.

Figure 4:
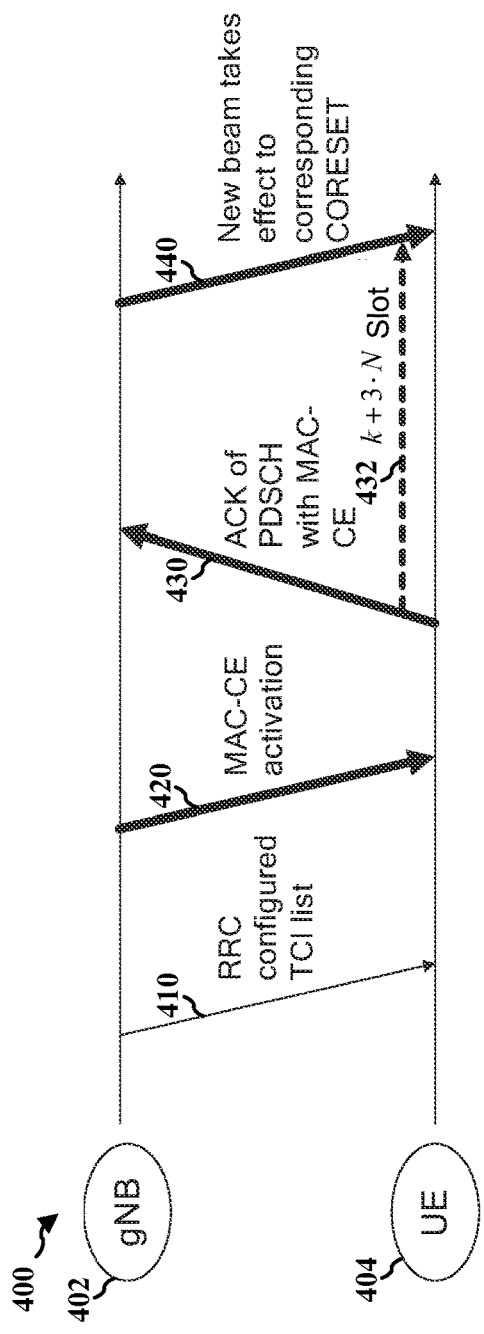
FIG. 4 is a diagram showing example communications between a base station and a UE for activating a new beam using a media access control (MAC) control element (CE).

FIG. 4 is a diagram 400 showing example communications between a base station (e.g., gNB 402) and a UE 404 for activating a new beam using a media access control (MAC) control element (CE). The gNB 402 may transmit an RRC configuration 410 that configures a TCI list for a possible beam indication of a channel or a groups of channels. The TCI list may include one or more TCI states with each TCI state associated with an identifier. The gNB 402 may later transmit a MAC-CE activation 420 that indicates an identifier of a TCI state in the TCI list. The MAC-CE activation 420 may be transmitted with a PDSCH.

Accordingly, the UE 404 may transmit an acknowledgment 430 of the PDSCH including the MAC-CE activation 420. When the gNB 402 receives the acknowledgment 430, the gNB 402 may confirm that the UE 404 has received the MAC-CE activation. In an aspect, an activation time 432 until the gNB 402 may transmit a DCI 440 using the new beam may be fixed based on the time of the acknowledgment 430. For instance, the activation time 432 may be at least 3 slots or 3 ms after the acknowledgment in order to allow layer 2 processing of the MAC-CE. Accordingly, the communications in FIG. 4 may involve processing at layer 2 in order to make a change at layer 1, and may introduce latency.

Figure 5:
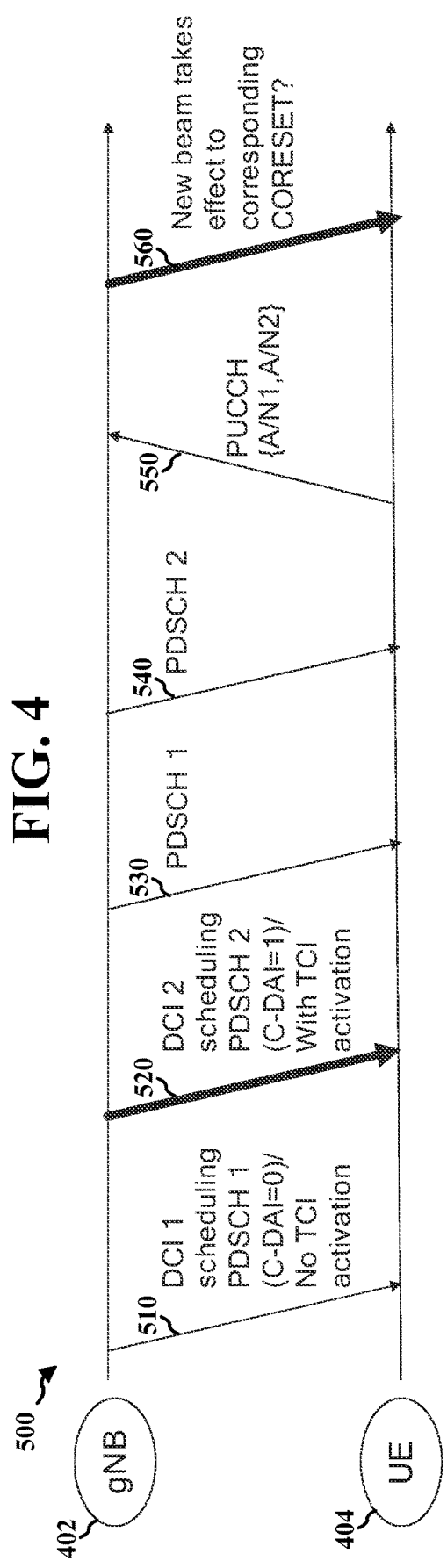
FIG. 5 is a diagram showing example communications between a base station and a UE for activating a new beam using a downlink control information (DCI).

FIG. 5 is a diagram 500 showing example communications between a base station (e.g., gNB 402) and a UE 404 for activating a new beam using a DCI. The gNB 402 may transmit a first DCI 510 that schedules a first PDSCH 530. In the dynamic HARQ codebook or Type II HARQ codebook configuration, the first DCI 510 may include a counter downlink assignment index (cDAI) that indicates a number of scheduled downlink transmissions up to the point that the DCI was received. For example, the cDAI may have a value of 0 indicating the first DCI 510 schedules a first transmission. In this example, the first DCI 510 may not include a TCI activation. The gNB 402 may transmit a second DCI 520 that schedules a second PDSCH 540. The second DCI 520 may include a cDAI having a value of 1 indicating that the second PDSCH 540 is a second transmission. The second DCI 520 may include a TCI activation. The gNB 402 may transmit and the UE 404 may receive the first PDSCH 530 and the second PDSCH 540. The UE 404 may then transmit a PUCCH 550 including an uplink control information (UCI) having two ACK/NACK bits, one for each PDSCH (e.g., A/N1 and A/N2). In an aspect, the PUCCH may be ambiguous as to whether the second DCI 520 was received correctly. For example, the UE 404 may decode the second DCI 520 correctly, but fail to decode the second PDSCH 540. Accordingly, the UE 404 may transmit a NACK for the second UCI bit corresponding to the PDSCH 530. The UE 404, however, may have also missed the second DCI 520. Accordingly, the gNB 402 may be uncertain as to whether the UE 404 received the second DCI 520 including the TCI activation. Therefore, there may be ambiguity as to whether the gNB 402 and the UE 404 switch beams for the CORESET for a third DCI 560.

FIG. 6 is a diagram 600 showing example communications between a base station (e.g., gNB 402) and a UE 404 for activating a new beam based on an acknowledgment of a downlink transmission scheduled by a DCI. The gNB 402 may transmit an RRC message 610 that configures a TCI list, for example, by adding or removing TCI states from the TCI list. Each TCI in the TCI list may refer to a reference signal, such as CSI-RS, or SSB, or SRS. The configured TCI list may indicate parameters of TCI states that may be selected. The gNB 402 may optionally transmit a MAC-CE 620 that includes a TCI subset selection. The TCI subset selection may identify a number of TCI states that may be activated with a DCI. A TCI field in the DCI may be used to indicate the TCI. Each codepoint in the TCI field of the DCI corresponding to one of the TCI states in the subset. In particular, one codepoint may be reserved as not to indicate the new TCI. The TCI subset selection may define an identifier (ID) or index for each TCI state. The use of an index may minimize the number of bits, i.e., the length of the field in the DCI for TCI indication. The gNB 402 may transmit a DCI 630 having format 1_1 that includes a field for indicating a TCI for a control beam. The indicated TCI may be a TCI ID having a value of x that identifies one of the TCIs on the TCI list. The DCI 630 may also schedule a PDSCH 640 having a HARQ ID with a value of y. The gNB 402 may transmit the scheduled transmission of the PDSCH 640 that may or may not use a data beam based on the TCI x. Similarly, the UE 404 may receive the scheduled transmission of the PDSCH 640 that may or may not use a data beam based on the TCI x. The UE 404 may transmit an ACK 650 for the PDSCH 640 having the HARQ ID y. For example, the ACK 650 may be a UCI carried on the PUCCH. After a time offset 652, both the gNB 402 and the UE 404 may switch a respective beam for the applicable channels based on the TCI x. For example, the TCI list including the TCI x may be higher-layer configured applicable to a CORESET. In other words, the gNB 402 and the UE 404 may update the TCI used to transmit/receive the CORESET with the TCI ID x. Accordingly, the new control beam may be activated. For instance, the gNB 402 may transmit a DCI 660 using the new control beam, and the UE 404 may receive the DCI 660 using the new control beam. In an aspect, because the TCI activation is indicated using layer 1 indication in the DCI, the time offset 652 may be relatively shorter than the activation time 432. For instance, the time offset 652 may be a number of symbols sufficient to allow transmission of a DCI scheduling a retransmission of the PDSCH 640 in case the is indicated as NACK or is not received correctly.

FIG. 7 is a diagram 700 showing example communications between a base station (e.g., gNB 402) and a UE 404 for activating a new beam based on an uplink transmission scheduled by a DCI. Similar to the communications of FIG. 6, the gNB 402 may transmit an RRC message 610 that includes a configured TCI list and a MAC-CE 620 that includes the TCI subset selection. The gNB 402 may transmit a DCI 730 having format 0_1 for scheduling an uplink transmission 740. In an aspect, the DCI format 0_1 may support inclusion of a field to indicate the TCI. In another aspect, the DCI format 0_1 may include a field to indicate the new spatial relation information (SRI) that similarly indicates new beam information as TCI. In an aspect, an RRC configuration message may indicate whether the DCI format 0_1 includes a field for TCI ID. The UE 404 may transmit the scheduled uplink transmission 740, which may be a PUSCH. The uplink transmission may be transmitted based on the TCI indicated by the DCI 730. Other possible uplink transmissions may include PRACH, SRS, or CSI report. The uplink transmission 740 may serve as an acknowledgment of the DCI 730. That is, the UE 404 only transmits the uplink transmission 740 when the DCI 730 is correctly received, so the uplink transmission 740 indicates that the UE 404 correctly received the DCI 730. Therefore, the time offset 652 may be measured from the uplink transmission 740. After the time offset 652, both the gNB 402 and the UE 404 may switch beams according to the indicated TCI. For example, if the TCI list is configured for a CORESET which may carry the DCI 750, then the beam of CORESET is switched as the indicated DCI.

FIG. 8 is a diagram 800 showing example messages for activating a new beam based on a DCI scheduling a single PDSCH. In a first slot, n, a DCI 812 may be transmitted in a CORESET 810 using an old control beam, and the scheduled PDSCH 814 may be transmitted using an old data beam. In a second slot, n+1, a DCI 822 may be transmitted in the CORESET 810 The DCI 822 may include a new TCI indication. Accordingly, the scheduled PDSCH 824 may be transmitted using the new data beam indicated by the new TCI indication. In slot n+x, the PDSCH 824 may be acknowledged by a PUCCH 830. The PUCCH 830 may include an ACK corresponding to the HARQ ID of the PDSCH 824. Accordingly, the PUCCH 830 may be an implicit acknowledgment of the DCI 822. In slot n+x+y, a DCI 842 may be transmitted using the new control beam for the CORESET 810 indicated by the new TCI indication of the DCI 822. The variable x may refer to a time between the PDSCH 824 and the PUCCH 830. The variable y may refer to the time offset 652. The scheduled PDSCH 844 may or may not be transmitted with the new data beam.

Still referring to FIG. 8, where type II or semi-static HARQ codebook is used. In a second slot, n+1, a DCI 822 may be transmitted in the CORESET 810. The DCI 822 may include a new TCI indication. In slot n+x, the PDSCH 824 may be acknowledged by a PUCCH 830. In addition to the ACK bit for the PDSCH 824, the PUCCH 830 may also include another ACK bit if a SPS PDSCH release is indicated by DCI format 1_0 with counter DAI field value of 1 on the PCell, a PDSCH reception scheduled by DCI format 1_0 with counter DAI field value of 1 on the PCell in slot n by the DCI 812, or a SPS PDSCH reception 814 without the DCI 812 in slot n. In this case, when the DCI 822 is missed but the DCI 812 or a SPS PDSCH reception 814 is received by the UE. The UE may transmit only one ACK bit in another PUCCH rather than two ACK bits in PUCCH 830. The gNB 402 can only switch the beam according to the TCI indicated in the DCI 822 when the PUCCH 830 is received and the ACK bit for the PDSCH 824 is ACK.

FIG. 9 is a diagram 900 showing example messages for activating a new beam based on a DCI scheduling a PDSCH including multiple codewords or transport blocks. Similar to the scenario in FIG. 8, the DCI 812 on the CORESET 810 may schedule a PDSCH 814 using the old beam. In slot n+1, the DCI 922 may schedule a PDSCH 924 which contains two codewords or two transport blocks (e.g., TB1, TB2), which may be decoded and acknowledged separately. Therefore, one or both of the transport blocks in the PDSCH 924 may be incorrectly received. The PUCCH 930 may include an ACK/NACK bit for each transport block. The DCI 922 may be acknowledged when either of the ACK/NACK bits in the PUCCH 930 is a positive ACK. That is, as long as one of the transport blocks is received correctly, the UE also correctly received the DCI 922. The time offset 652 may be measured from the end of the transmission of the PUCCH 930 including at least one positive acknowledgment to the PDSCH 924, and the DCI 942 in the CORESET 810 may be transmitted with the new control beam to schedule the PDSCH 944 that may or may not use the new data beam.

Figure 10:
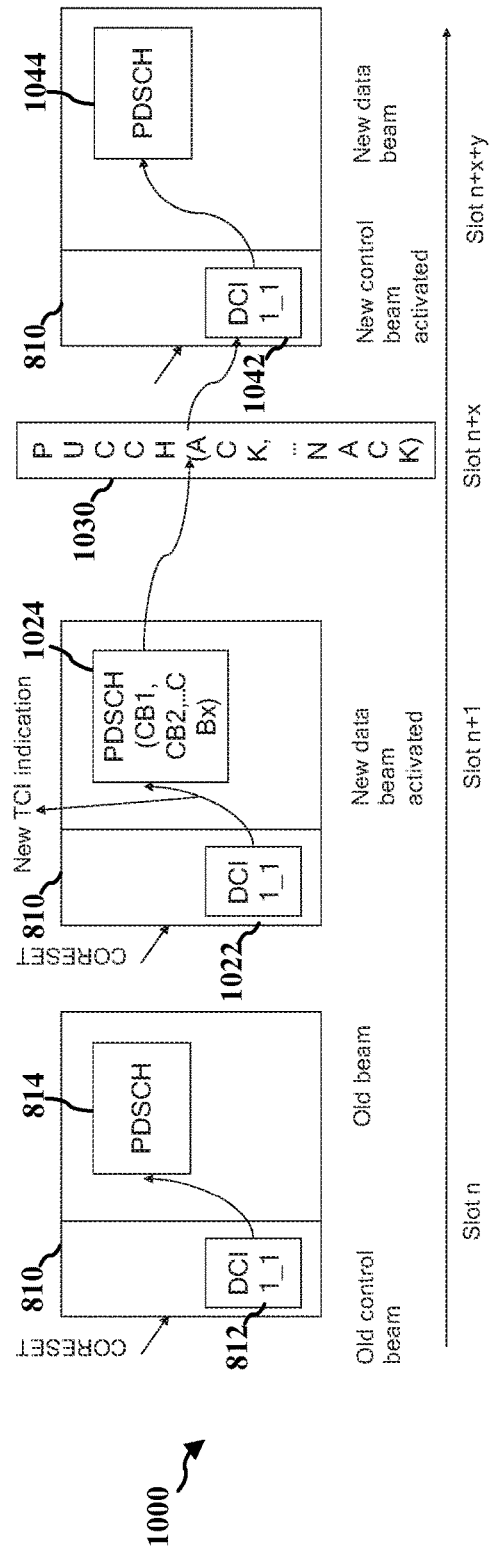
FIG. 10 is a diagram showing example messages for activating a new beam based on a DCI scheduling a PDSCH including multiple code block groups.

FIG. 10 is a diagram 1000 showing example messages for activating a new beam based on a DCI scheduling a PDSCH including multiple code block groups. Similar to the scenario in FIG. 8, the DCI 812 on the CORESET 810 may schedule a PDSCH 814 using the old beam. In slot n+1, the DCI 1022 may schedule a PDSCH 1024 using multiple code block groups. Accordingly, the PDSCH 1024 may include multiple code block groups, which may be decoded and acknowledged separately. Therefore, it is possible that one or more of the code block groups in the PDSCH 1024 may be incorrectly received. The PUCCH 1030 may include an ACK/NACK bit for each code block group. The DCI 1022 may be acknowledged when any of the ACK/NACK bits in the PUCCH 930 is a positive ACK. That is, as long as one of the code block groups is received correctly, the UE also correctly received the DCI 1022. The time offset 652 may be measured from the end of the transmission of the PUCCH 1030 including at least one positive acknowledgment, and the DCI 1042 in the CORESET 810 may be transmitted with the new control beam to schedule the PDSCH 1044 that may or may not use the new data beam.

Figure 11:
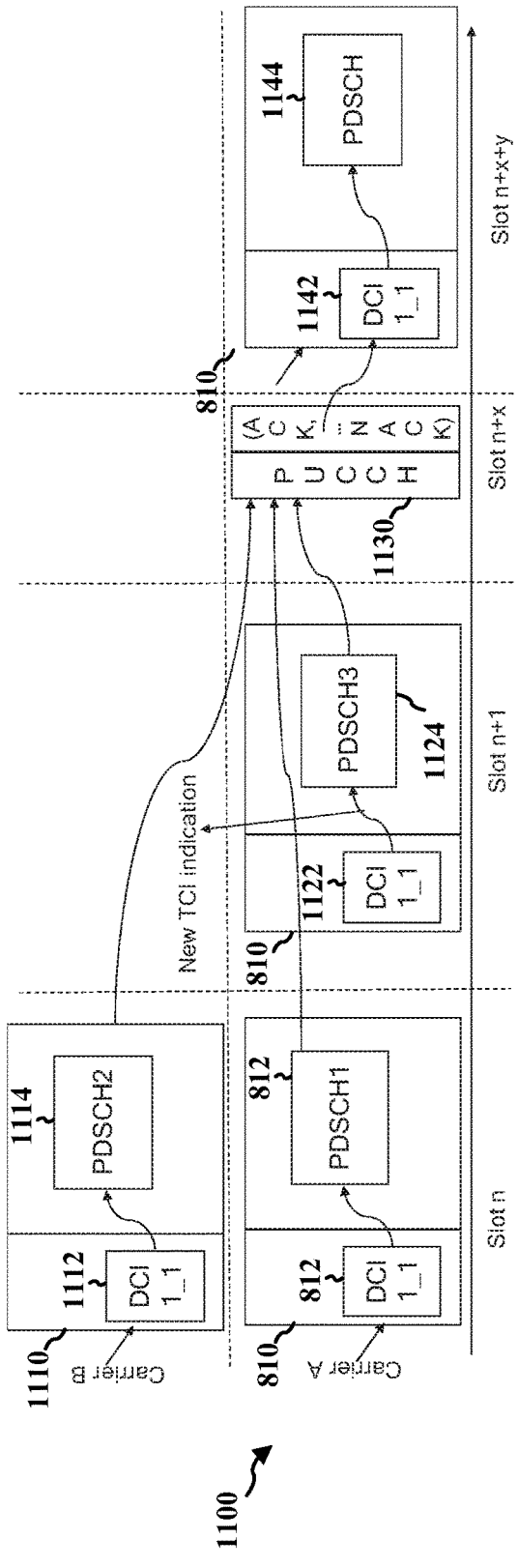
FIG. 11 is a diagram showing example messages for activating a new beam when multiple DCIs schedule multiple PDSCHs.

FIG. 11 is a diagram 1100 showing example messages for activating a new beam when multiple DCIs schedule multiple PDSCHs. Similar to the scenario in FIG. 8, the DCI 812 on the CORESET 810 may schedule a PDSCH 814 using the old beam. The CORESET 810 may be for a first carrier A. On a second carrier B having a second CORESET 1110, a second DCI 1112 may schedule a second PDSCH 1114 In slot n+1, a third DCI 1122 may schedule a third PDSCH 1124. Each of the foregoing PDSCHs may be acknowledged by the PUCCH 1130, which may include an ACK/NACK bit for each PDSCH. The DCI 1122 that carries the new TCI indication may be considered acknowledged only when the third PDSCH 1124 scheduled by the DCI 1122 is positively acknowledged. That is, when the ACK/NACK bit of the PUCCH 1130 corresponding to the PDSCH 1124 indicates ACK, the UE has correctly received the DCI 1122. The time offset 652 may be measured from the end of the transmission of the PUCCH 1130, and the DCI 1142 in the CORESET 1110 may be transmitted with the new control beam to schedule the PDSCH 1144 that may or may not use the new data beam.

Figure 12:
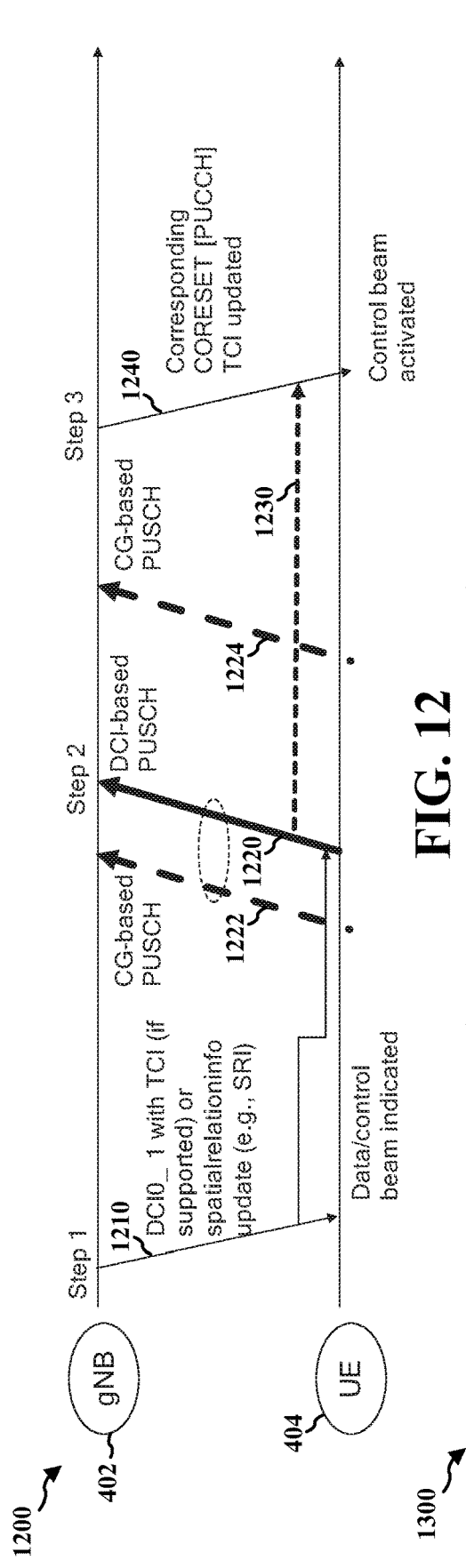
FIG. 12 is a diagram showing example communications between a base station and a UE for activating a new beam based on an uplink transmission scheduled by a DCI in the presence of other uplink transmissions scheduled by a configured grant.

FIG. 12 is a diagram 1200 showing example communications between a base station (e.g., gNB 402) and a UE 404 for activating a new beam based on an uplink transmission scheduled by a DCI in the presence of other uplink transmissions scheduled by a configured grant. The configured grant may provide periodic scheduling of uplink transmissions such as PUSCH 1222, 1224. In some scenarios, the resources for a configured grant may coincide with the resources in a DCI. For example, the gNB 402 may transmit a DCI 1210 including a TCI or SRI indicating a new beam and scheduling a PUSCH 1220. The PUSCH 1220 may coincide with a PUSCH 1222 based on the configured grant. That is, the PUSCH 1220 may be scheduled on the same time and frequency domain resources as the PUSCH 1222. In one case, the UE 404 may determine whether to transmit the PUSCH 1220 or the PUSCH 1222, for example, using a priority rule. In another case, the UE may miss the detection of the DCI 1210. The gNB 402, however, may be unable to determine whether the PUSCH 1220 or the PUSCH 1222 is received if the transmission properties of the PUSCH 1220 and the PUSCH 1222 are identical. Accordingly, when transmitting the DCI 1210, the gNB 402 may ensure that the transmission properties of the PUSCH 1220 are different than the transmission properties of any configured grant. For example, the gNB 402 may ensure that at least one of MCS, scrambling sequence of DMRS, or frequency domain resource assignment (FDRA) of the PUSCH 1220 is different than a corresponding property of an active configured grant for the UE. Accordingly, the gNB 402 may distinguish between the PUSCH 1220 and the PUSCH 1222, and only the PUSCH 1220 may be considered an acknowledgment of the DCI 1210. Therefore, the gNB 402 and the UE 404 may activate the control beam based on the TCI or SRI after the time offset 1230 measured from the end of the transmission of the PUSCH 1220. The gNB 402 may transmit a DCI 1240 that may or may not use the new control beam.

Figure 13:
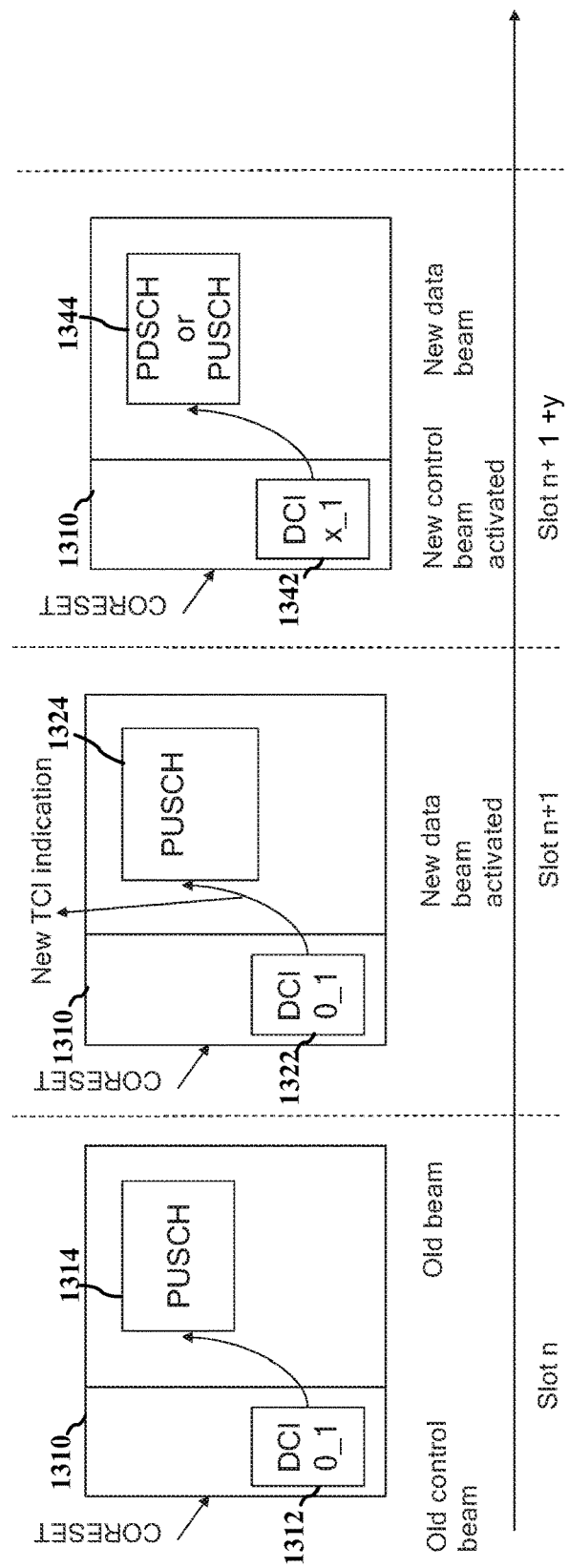
FIG. 13 is a diagram showing example messages for activating a new beam based on a DCI scheduling a single physical uplink shared channel (PUSCH).

FIG. 13 is a diagram 1300 showing example messages for activating a new beam based on a DCI scheduling a single PUSCH. In a first slot, n, a DCI 1312 may be transmitted in a CORESET 1310 using an old control beam, and the scheduled PUSCH 1314 may be transmitted using an old data beam. In a second slot, n+1, a DCI 1322 may be transmitted in the CORESET 1310 The DCI 1322 may include a new TCI indication. Accordingly, the scheduled PUSCH 1324 may be transmitted using the new data beam indicated by the new TCI indication. The PUCCH 1324 may be an acknowledgment of the DCI 1322. In slot n+1+y, a DCI 1342 may be transmitted using the new control beam for the CORESET 1310 indicated by the new TCI indication of the DCI 1322. The variable y may refer to the time offset 652. The scheduled PUSCH 1344 may be transmitted with the new beam.

Figure 14:
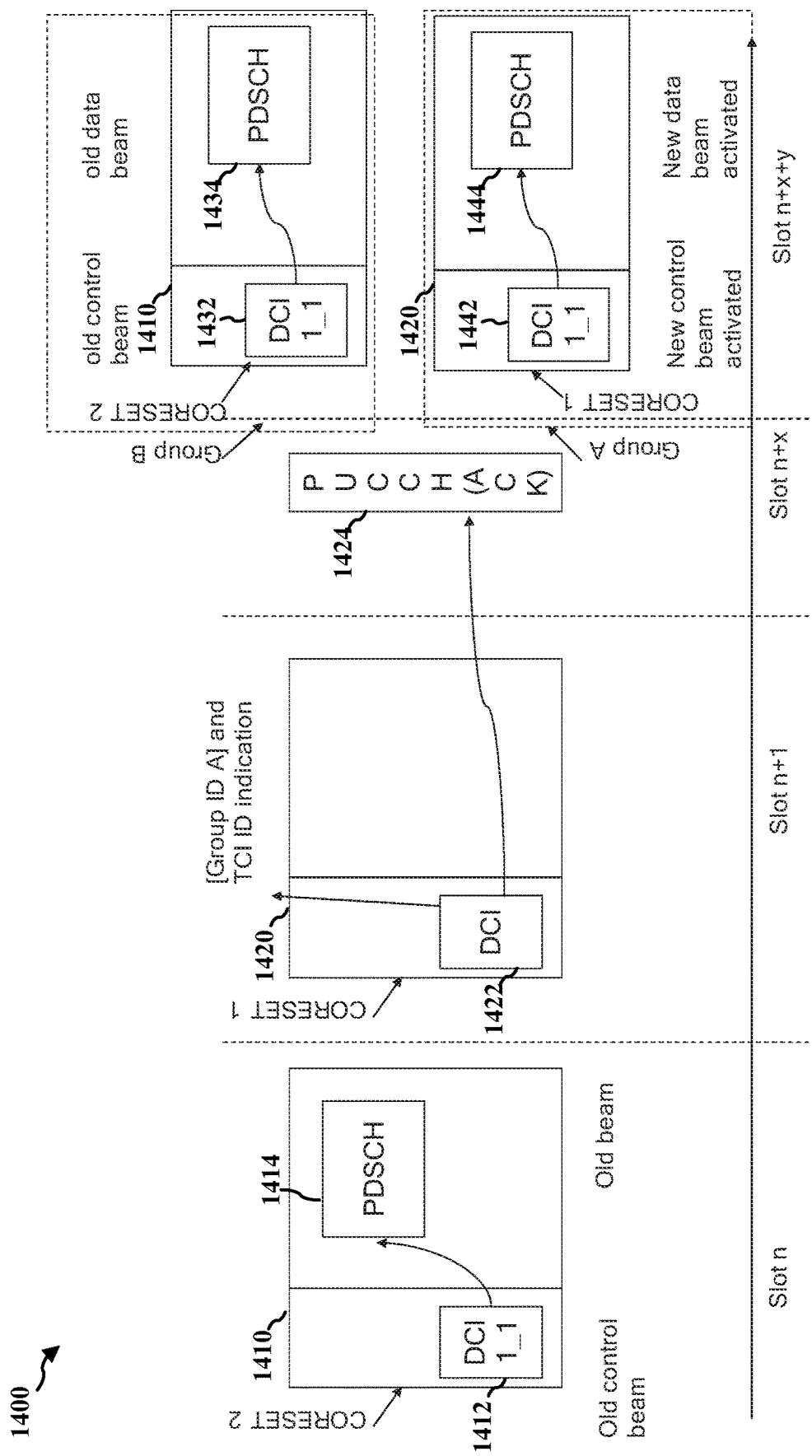
FIG. 14 is a diagram showing example messages for activating one or more beams for a group of channels.

FIG. 14 is a diagram 1400 showing example messages for activating one or more beams for a group of channels utilizing different CORESETS (e.g., a first CORESET 1420 and a second CORESET 1410) and different channel groups. A channel group may be configured as any channel or any group of DL or UL physical channels, e.g., CORESET, PDCCH, PDSCH, PUCCH, PUSCH, SRS, CSI-RS, or PRACH by the RRC message which is to apply the TCI list. The channel groups may be configured by RRC or MAC-CE. In a first slot, n, the second CORESET 1410 may carry a DCI 1412 using the old control beam for the second CORESET 1410. The scheduled PDSCH 1414 may be transmitted using the old beam. In a second slot, n+1, the first CORESET 1420 may include a DCI 1422 including a TCI ID indication for a new beam. The DCI 1422 may also schedule a PUCCH 1424. The DCI 1422 may also include a channel group ID, which may indicate that the TCI ID is applicable to group A, which includes the first CORESET 1420. In another aspect, the DCI 1422 may not include a channel group ID and the TCI ID may be applicable to the channel group including the CORESET on which the DCI is received, which would be group A in this example. In slot n+x, the UE may transmit the PUCCH 1424, which may be scheduled by the DCI 1422 and include an ACK of the PDSCH 1414. The PUCCH 1424 may be considered an acknowledgment of the DCI 1422. In a slot n+x+y, channels in the group B including the second CORESET 1410 may continue to utilize the old beams. For example, the second CORESET 1410 may include a DCI 1432 using the old control beam that schedules the PDSCH 1434 using the old data beam. In contrast, the channels in the group A including the first CORESET 1420 may utilize the new beams. For example, the first CORESET 1420 may include the DCI 1442 using the new control beam that schedules the PDSCH 1444 using the new data beam.

Figure 15:
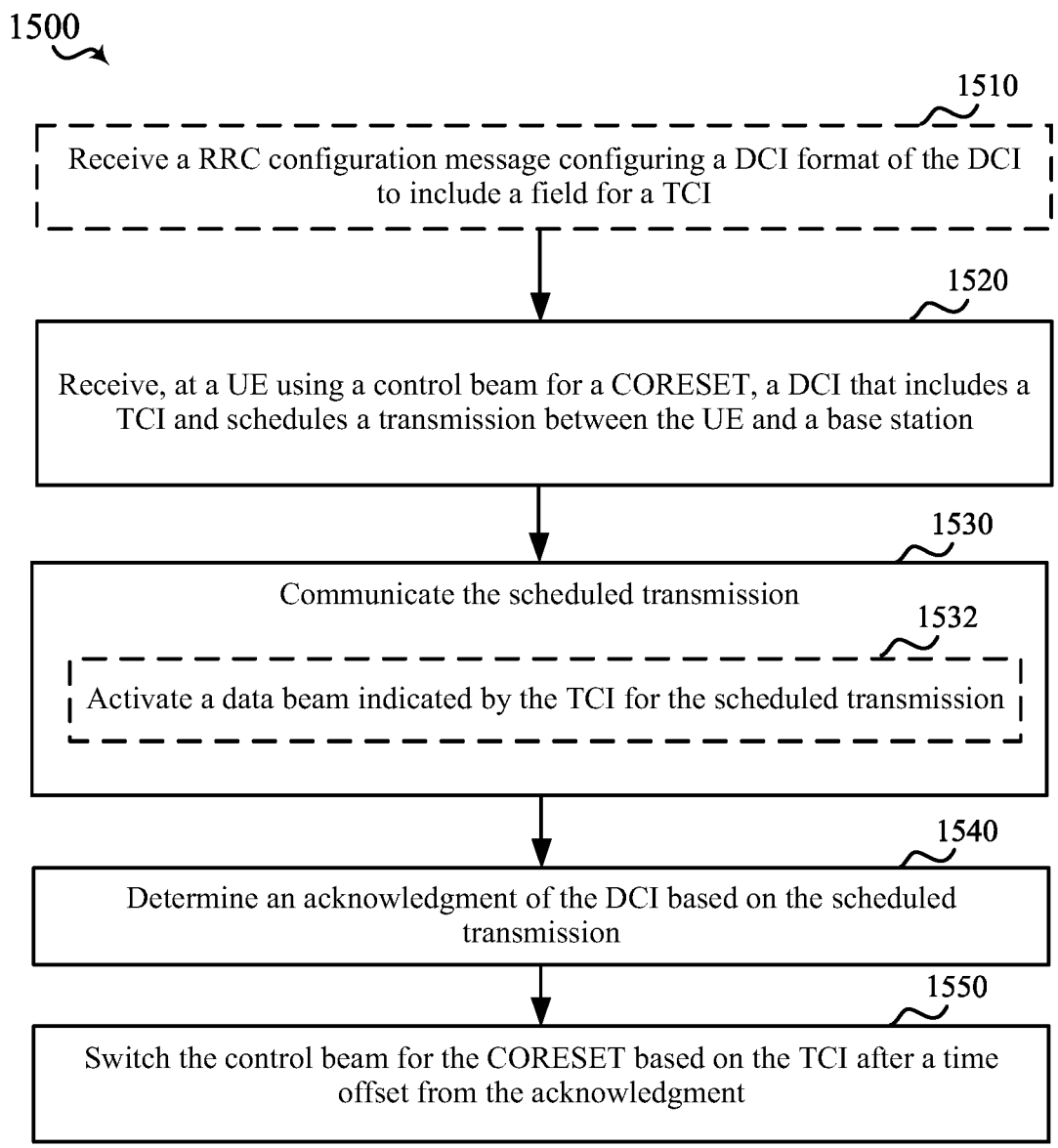
FIG. 15 is a flowchart of a method of wireless communication for a UE.

FIG. 15 is a flowchart of an example method 1500 for beam indication. The method 1500 may be performed by a UE (such as the UE 104, which may include the memory 360 and which may be the entire UE 104 or a component of the UE 104 such as the beam activation component 140, TX processor 368, the RX processor 356, or the controller/processor 359). The method 1500 may be performed by the beam activation component 140 in communication with the beam indication component 198 of the base station 102.

At block 1510, the method 1500 may optionally include receiving a radio resource configuration message configuring a DCI format of the DCI to include a field for TCI indication. In an aspect, for example, the UE 104, the RX processor 356 and/or the controller/processor 359 may execute the beam activation component 140 to receive radio resource configuration message configuring a DCI format of the DCI to include a field for TCI indication. Accordingly, the UE 104, RX processor 356, and/or the controller/processor 359 executing the beam activation component 140 may provide means for receiving a radio resource configuration message configuring a DCI format of the DCI to include a field for TCI indication.

At block 1520, the method 1500 may include receiving, at a UE using a control beam for a CORESET, a DCI that includes a TCI and schedules a transmission between the UE and a base station. In an aspect, for example, the UE 104, the RX processor 356 and/or the controller/processor 359 may execute the beam activation component 140 and/or the DCI component 142 to receive, at a UE using a control beam for a CORESET, a DCI that includes a TCI and schedules a transmission between the UE 104 and a base station 102. The TCI may be a spatial relationship information update. The TCI may be applicable to a group of physical channels, which may be defined by RRC configuration, for example. The DCI may include a channel group identifier indicating the group of physical channels. In another aspect, the group of physical channels may be a group of physical channels including the CORESET on which the DCI is received. Accordingly, the UE 104, RX processor 356, and/or the controller/processor 359 executing the beam activation component 140 and/or the DCI component 142 may provide means for receiving, at a UE using a control beam for a CORESET, a DCI that includes a TCI and schedules a transmission between the UE and a base station.

At block 1530, the method 1500 may include communicating the scheduled transmission. In an aspect, for example, the UE 104, RX processor 356, TX processor 368 and/or the controller/processor 359 may execute the beam activation component 140 and/or the communication component 144 to communicate the scheduled transmission. For example, if the scheduled transmission is a PDSCH, the communication component 144 may receive the PDSCH according to the DCI. As another example, if the scheduled transmission is a PUSCH, the communication component 144 may transmit the PUSCH according to the DCI. Similarly, for uplink transmissions such as PRACH, SRS, and CSI report, the communication component 144 may transmit the scheduled uplink transmission. Accordingly, the UE 104, RX processor 356, TX processor 368 and/or the controller/processor 359 executing the beam activation component 140 and/or communication component 144 may provide means for communicating the scheduled transmission.

At sub-block 1532, the block 1530 may optionally include activating a data beam indicated by the TCI for the scheduled transmission. The switching component 148 may activate the data beam indicated by the TCI for the scheduled transmission. That is, the new data beam indicated by the TCI may be used for the scheduled transmission before an acknowledgment of the DCI.

At block 1540, the method 1500 may include determining an acknowledgment of the DCI based on the scheduled transmission. In an aspect, for example, the UE 104, TX processor 368, and/or the controller/processor 359 may execute the beam activation component 140 and/or the acknowledgment component 146 to determine an acknowledgment of the DCI based on the scheduled. That is, the acknowledgment component 146 may determine that the DCI has been acknowledged based on the properties of the scheduled transmission. For example, as illustrated in FIG. 6, a DCI scheduling a downlink transmission may be acknowledged when positive ACK for at least part of the scheduled transmission is transmitted. As another aspect, as illustrated in FIG. 7, a DCI scheduling an uplink transmission may be acknowledged when the uplink transmission is transmitted. Accordingly, the UE 104, TX processor 368 or the controller/processor 359 executing the beam activation component 140 and/or the acknowledgment component 146 may provide means for determining an acknowledgment of the DCI based on the scheduled transmission.

At block 1550, the method 1500 may include switching the control beam for the CORESET based on the TCI after a time offset from the acknowledgment. In an aspect, for example, the UE 104, RX processor 356, and/or the controller/processor 359 may execute the beam activation component 140 and/or the switching component 148 to switch the control beam for the CORESET based on the TCI after a time offset from the acknowledgment. For example, the switching component 148 may configure the antennas with the TCI parameters indicated by the TCI. The TCI parameters may include analog and/or digital beamforming parameters such as a precoding matrix. In an aspect, the time offset from the acknowledgment may be a number of symbols. For example, for a 15 kHz subcarrier spacing, the time offset may be 28 symbols. In an aspect, the time offset includes at least one slot for a second DCI to schedule a retransmission of the scheduled transmission when the acknowledgment of the DCI fails. Accordingly, the UE 104, RX processor 356 or the controller/processor 359 executing the beam activation component 140 and/or switching component 148 may provide means for switching the control beam for the CORESET based on the TCI after a time offset from the acknowledgment.

Figure 16:
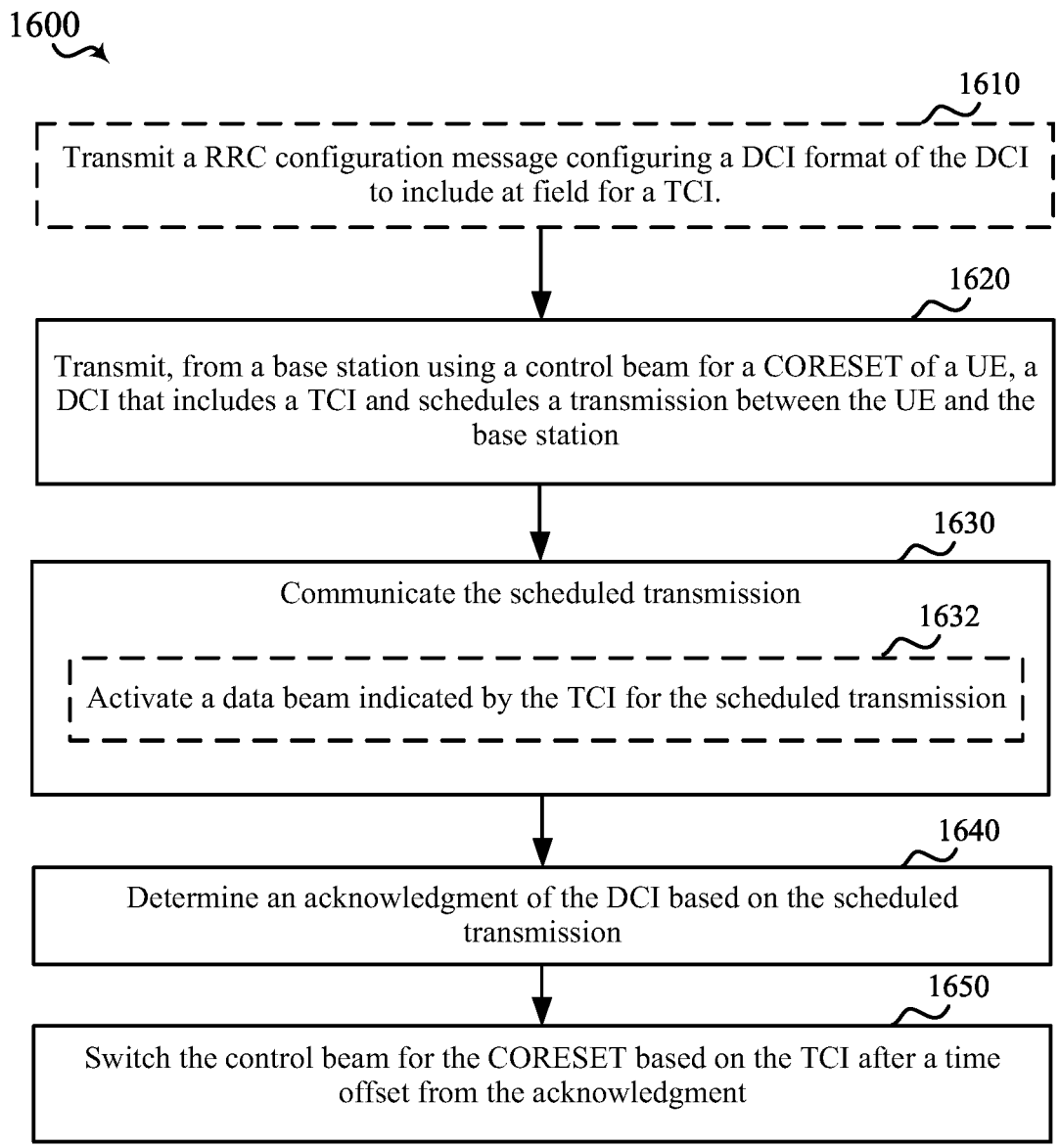
FIG. 16 is a flowchart of a method of wireless communication for a base station.

FIG. 16 is a flowchart of an example method 1600 for beam indication. The method 1600 may be performed by a base station (such as the base station 102, which may include the memory 360 and which may be the entire UE 104 or a component of the UE 104 such as the beam indication component 198, TX processor 316, the RX processor 370, or the controller/processor 375). The method 1600 may be performed by the beam indication component 198 in communication with the beam activation component 140 of the UE 104.

At block 1610, the method 1600 may optionally include transmitting a RRC configuration message configuring a DCI format of the DCI to include a filed for TCI indication. In an aspect, for example, the base station 102, the controller/processor 375, and/or the TX processor 316 may execute the beam indication component 198 to transmit the RRC configuration message configuring a DCI format of the DCI to include a field for TCI indication. Accordingly, the base station 102, TX processor 316, and/or the controller/processor 375 executing the beam indication component 198 may provide means for transmitting a radio resource configuration message configuring a DCI format of the DCI to include a field for TCI indication.

At block 1620, the method 1600 may include transmitting, from a base station using a control beam for a CORESET of a UE, a DCI that includes a TCI and schedules a transmission between the UE and the base station. In an aspect, for example, the base station 102, TX processor 316, or the controller/processor 375 may execute the beam indication component 198 and/or the DCI component 1842 to transmit from the base station 102 using a control beam for a CORESET of a UE, a DCI that includes a TCI and schedules a transmission between the UE 104 and the base station 102. The TCI may be a spatial relationship information update. The TCI may be applicable to a group of physical channels, which may be defined by RRC configuration, for example. The DCI may include a channel group identifier indicating the group of physical channels. In another aspect, the group of physical channels may be a group of physical channels including the CORESET on which the DCI is received. Accordingly, the base station 102, TX processor 316, and/or the controller/processor 375 executing the beam indication component 198 and/or the DCI component 1842 may provide means for transmitting, from a base station using a control beam for a CORESET of a UE, a DCI that includes a TCI and schedules a transmission between the UE and the base station.

At block 1630, the method 1600 may include communicating the scheduled transmission. In an aspect, for example, the base station 102, TX processor 316, or the controller/processor 375 may execute the beam indication component 198 and/or the communication component 1844 to communicate the scheduled transmission. For example, if the scheduled transmission is a PDSCH, the communication component 1844 may transmit the PDSCH according to the DCI. As another example, if the scheduled transmission is a PUSCH, the communication component 1844 may receive the PUSCH according to the DCI. Similarly, for uplink transmissions such as PRACH, SRS, and CSI report, the communication component 1844 may receive the scheduled uplink transmission. Accordingly, the UE 104, RX processor 356 or the controller/processor 359 executing the beam activation component 140 and/or communication component 1844 may provide means for communicating the scheduled transmission.

At sub-block 1632, the block 1630 may optionally include activating a data beam indicated by the TCI for the scheduled transmission. The switching component 1848 may activate the data beam indicated by the TCI for the scheduled transmission. That is, the new beam indicated by the TCI may be used for the scheduled transmission before an acknowledgment of the DCI.

At block 1640, the method 1600 may include determining an acknowledgment of the DCI based on the scheduled transmission. In an aspect, for example, the base station 102, RX processor 370, or the controller/processor 375 may execute the beam indication component 198 and/or the acknowledgment component 1846 to determine an acknowledgment of the DCI based on the scheduled transmission. That is, the acknowledgment component 1846 may determine that the DCI has been acknowledged based on the properties of the scheduled transmission. For example, as illustrated in FIG. 6, a DCI scheduling a downlink transmission may be acknowledged when positive ACK for at least part of the scheduled transmission is transmitted. As another aspect, as illustrated in FIG. 7, a DCI scheduling an uplink transmission may be acknowledged when the uplink transmission is transmitted. Accordingly, the base station 102, RX processor 370, or the controller/processor 375 executing the beam indication component 198 and/or the acknowledgment component 1846 may provide means for determining an acknowledgment of the DCI based on the scheduled transmission.

At block 1650, the method 1600 may include switching the control beam for the CORESET based on the TCI after a time offset from the acknowledgment. In an aspect, for example, the base station 102, RX processor 370, or the controller/processor 375 may execute the beam indication component 198 and/or the switching component 1848 to switch the control beam for the CORESET based on the TCI after a time offset from the acknowledgment. For example, the switching component 1848 may configure the antennas with the TCI parameters indicated by the TCI. The TCI parameters may include analog and/or digital beamforming parameters such as a precoding matrix. In an aspect, the time offset from the acknowledgment may be a number of symbols. For example, for a 15 kHz subcarrier spacing, the time offset may be 28 symbols. In an aspect, the time offset includes at least one slot for a second DCI to schedule a retransmission of the scheduled transmission when the acknowledgment of the DCI fails. Accordingly, the base station 102, RX processor 370, or the controller/processor 375 executing the beam indication component 198 and/or switching component 148 may provide means for switching the control beam for the CORESET based on the TCI after a time offset from the acknowledgment.

Figure 17:
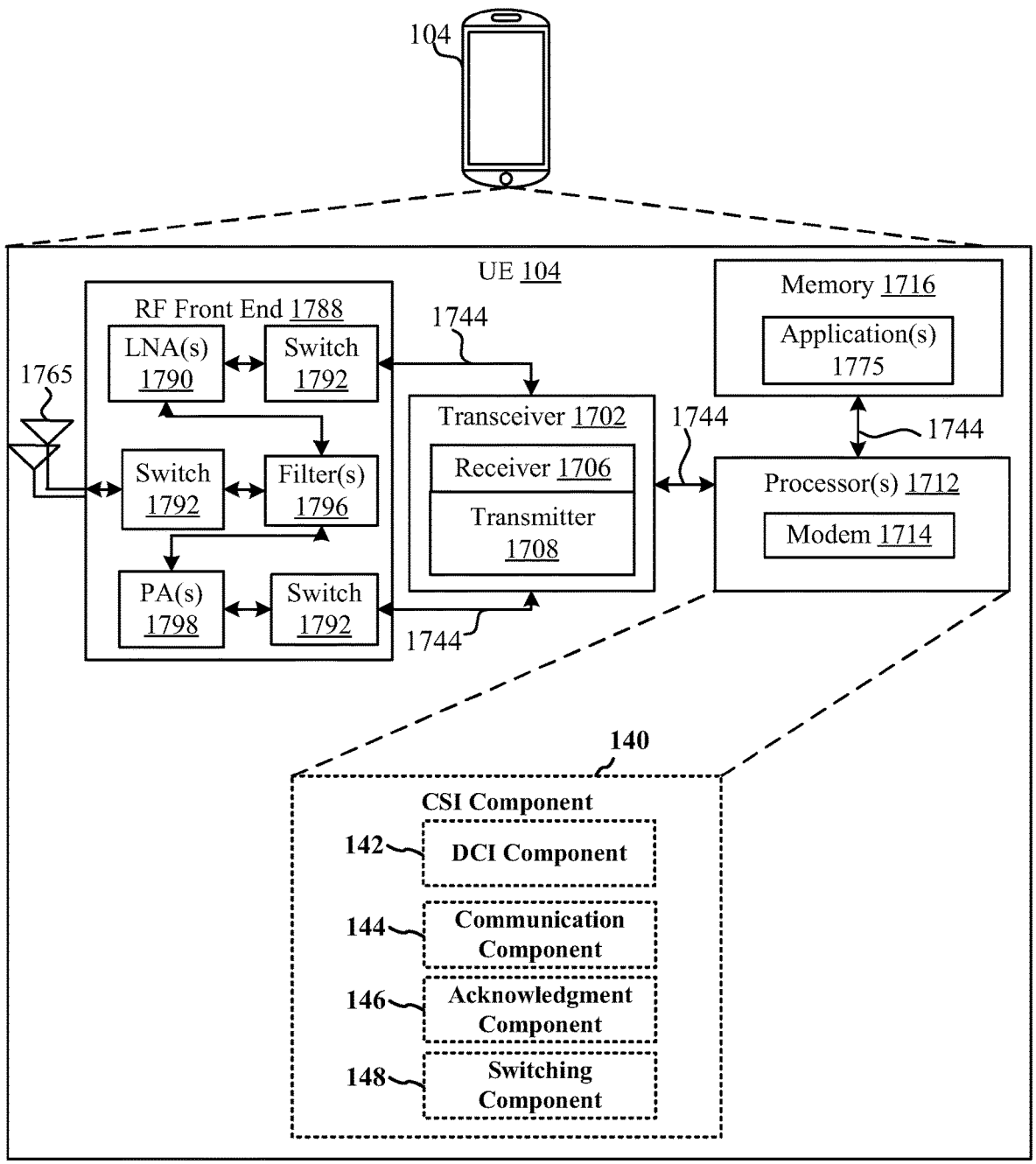
FIG. 17 is a diagram of example components of the UE of FIG. 1.

Referring to FIG. 17, one example of an implementation of UE 104 may include a variety of components, some of which have already been described above, but including components such as one or more processors 1712 and memory 1716 and transceiver 1702 in communication via one or more buses 1744, which may operate in conjunction with modem 1714, and beam activation component 140 to enable one or more of the functions described herein related to DCI based beam activation. Further, the one or more processors 1712, modem 1714, memory 1716, transceiver 1702, RF front end 1788 and one or more antennas 1765 may be configured to support voice and/or data calls (simultaneously or non-simultaneously) in one or more radio access technologies. The antennas 1765 may include one or more antennas, antenna elements, and/or antenna arrays.

In an aspect, the one or more processors 1712 may include a modem 1714 that uses one or more modem processors. The various functions related to beam activation component 140 may be included in modem 1714 and/or processors 1712 and, in an aspect, may be executed by a single processor, while in other aspects, different ones of the functions may be executed by a combination of two or more different processors. For example, in an aspect, the one or more processors 1712 may include any one or any combination of a modem processor, or a baseband processor, or a digital signal processor, or a transmit processor, or a receiver processor, or a transceiver processor associated with transceiver 1702. In other aspects, some of the features of the one or more processors 1712 and/or modem 1714 associated with beam activation component 140 may be performed by transceiver 1702.

Also, memory 1716 may be configured to store data used herein and/or local versions of applications 1775, beam activation component 140 and/or one or more of subcomponents thereof being executed by at least one processor 1712. Memory 1716 may include any type of computer-readable medium usable by a computer or at least one processor 1712, such as random access memory (RAM), read only memory (ROM), tapes, magnetic discs, optical discs, volatile memory, non-volatile memory, and any combination thereof. In an aspect, for example, memory 1716 may be a non-transitory computer-readable storage medium that stores one or more computer-executable codes defining beam activation component 140 and/or one or more of subcomponents thereof, and/or data associated therewith, when UE 104 is operating at least one processor 1712 to execute beam activation component 140 and/or one or more subcomponents thereof.

Transceiver 1702 may include at least one receiver 1706 and at least one transmitter 1708. Receiver 1706 may include hardware, firmware, and/or software code executable by a processor for receiving data, the code comprising instructions and being stored in a memory (e.g., computer-readable medium). Receiver 1706 may be, for example, a radio frequency (RF) receiver. In an aspect, receiver 1706 may receive signals transmitted by at least one base station 102. Additionally, receiver 1706 may process such received signals, and also may obtain measurements of the signals, such as, but not limited to, Ec/Io, SNR, RSRP, RSSI, etc. Transmitter 1708 may include hardware, firmware, and/or software code executable by a processor for transmitting data, the code comprising instructions and being stored in a memory (e.g., computer-readable medium). A suitable example of transmitter 1708 may including, but is not limited to, an RF transmitter.

Moreover, in an aspect, UE 104 may include RF front end 1788, which may operate in communication with one or more antennas 1765 and transceiver 1702 for receiving and transmitting radio transmissions, for example, wireless communications transmitted by at least one base station 102 or wireless transmissions transmitted by UE 104. RF front end 1788 may be connected to one or more antennas 1765 and may include one or more low-noise amplifiers (LNAs) 1790, one or more switches 1792, one or more power amplifiers (PAs) 1798, and one or more filters 1796 for transmitting and receiving RF signals.

In an aspect, LNA 1790 may amplify a received signal at a desired output level. In an aspect, each LNA 1790 may have a specified minimum and maximum gain values. In an aspect, RF front end 1788 may use one or more switches 1792 to select a particular LNA 1790 and its specified gain value based on a desired gain value for a particular application.

Further, for example, one or more PA(s) 1798 may be used by RF front end 1788 to amplify a signal for an RF output at a desired output power level. In an aspect, each PA 1798 may have specified minimum and maximum gain values. In an aspect, RF front end 1788 may use one or more switches 1792 to select a particular PA 1798 and its specified gain value based on a desired gain value for a particular application.

Also, for example, one or more filters 1796 may be used by RF front end 1788 to filter a received signal to obtain an input RF signal. Similarly, in an aspect, for example, a respective filter 1796 may be used to filter an output from a respective PA 1798 to produce an output signal for transmission. In an aspect, each filter 1796 may be connected to a specific LNA 1790 and/or PA 1798. In an aspect, RF front end 1788 may use one or more switches 1792 to select a transmit or receive path using a specified filter 1796, LNA 1790, and/or PA 1798, based on a configuration as specified by transceiver 1702 and/or processor 1712.

As such, transceiver 1702 may be configured to transmit and receive wireless signals through one or more antennas 1765 via RF front end 1788. In an aspect, transceiver 1702 may be tuned to operate at specified frequencies such that UE 104 can communicate with, for example, one or more base stations 102 or one or more cells associated with one or more base stations 102. In an aspect, for example, modem 1714 may configure transceiver 1702 to operate at a specified frequency and power level based on the UE configuration of the UE 104 and the communication protocol used by modem 1714.

In an aspect, modem 1714 may be a multiband-multimode modem, which can process digital data and communicate with transceiver 1702 such that the digital data is sent and received using transceiver 1702. In an aspect, modem 1714 may be multiband and be configured to support multiple frequency bands for a specific communications protocol. In an aspect, modem 1714 may be multimode and be configured to support multiple operating networks and communications protocols. In an aspect, modem 1714 may control one or more components of UE 104 (e.g., RF front end 1788, transceiver 1702) to enable transmission and/or reception of signals from the network based on a specified modem configuration. In an aspect, the modem configuration may be based on the mode of the modem and the frequency band in use. In another aspect, the modem configuration may be based on UE configuration information associated with UE 104 as provided by the network during cell selection and/or cell reselection.

Referring to FIG. 18, one example of an implementation of base station 102 may include a variety of components, some of which have already been described above, but including components such as one or more processors 1812 and memory 1816 and transceiver 1802 in communication via one or more buses 1854, which may operate in conjunction with modem 1814 and beam indication component 198 to enable one or more of the functions described herein related to DCI based beam indication.

The transceiver 1802, receiver 1806, transmitter 1808, one or more processors 1812, memory 1816, applications 1875, buses 1854, RF front end 1888, LNAs 1890, switches 1892, filters 1896, PAs 1898, and one or more antennas 1865 may be the same as or similar to the corresponding components of UE 104, as described above, but configured or otherwise programmed for base station operations as opposed to UE operations.

Some Further Example Implementations

A first example method of wireless communication, comprising: receiving, at a user equipment (UE) using a control beam for a control resource set (CORESET), a downlink control information (DCI) that includes a transmission configuration indicator (TCI) and schedules a transmission between the UE and a base station; communicating the scheduled transmission; determining an acknowledgment of the DCI based on the scheduled transmission; and switching the control beam for the CORESET based on the TCI after a time offset from the acknowledgment.

The above first example method, wherein the scheduled transmission is at least one physical downlink shared channel (PDSCH) and wherein the acknowledgment of the DCI is an acknowledgment of the at least one PDSCH.

Any of the above first example methods, wherein the at least one PDSCH includes at least two transport blocks and the acknowledgment of the at least one PDSCH is an uplink control information (UCI) bit indicating a positive acknowledgment for at least one of the transport blocks.

Any of the above first example methods, wherein the at least one PDSCH includes multiple code block groups and the acknowledgment is a UCI bit indicating a positive acknowledgment for at least one of the code block groups.

Any of the above first example methods, wherein the acknowledgment is a UCI including bits for multiple PDSCHs and wherein at least one bit corresponding to the PDSCH scheduled by the DCI indicates a positive acknowledgment.

Any of the above first example methods, wherein a hybrid automatic repeat request (HARQ) codebook for the acknowledgment of the at least one PDSCH is one of a Type I, Type II, or TYPE III HARQ codebook.

Any of the above first example methods, wherein the scheduled transmission is a physical uplink shared channel (PUSCH) and the acknowledgment of the DCI is the PUSCH.

Any of the above first example methods, wherein the PUSCH has a different transmission characteristic than any PUSCH for the UE scheduled by a configured grant.

Any of the above first example methods, further comprising receiving a radio resource configuration message configuring a DCI format of the DCI to include a field for TCI indication.

Any of the above first example methods, wherein the scheduled transmission is one of a physical random access channel (PRACH), sounding reference signal (SRS), or channel state information (CSI) report and the acknowledgment of the DCI is the scheduled transmission.

Any of the above first example methods, wherein the time offset from the acknowledgment is a number of symbols.

Any of the above first example methods, wherein the time offset includes at least one slot for a second DCI to schedule a retransmission of the scheduled transmission when the acknowledgment of the DCI fails.

Any of the above first example methods, wherein the TCI is applicable to a group of physical channels.

Any of the above first example methods, wherein the DCI includes a channel group identifier indicating the group of physical channels.

Any of the above first example methods, wherein the group of physical channels is a group of physical channels including the CORESET on which the DCI is received.

Any of the above first example methods, wherein communicating the scheduled transmission comprises activating a data beam indicated by the TCI for the scheduled transmission.

A second example method of wireless communication, comprising: transmitting, from a base station using a control beam for a control resource set (CORESET) of a user equipment (UE), a downlink control information (DCI) that includes a transmission configuration indicator (TCI) and schedules a transmission between the UE and the base station; communicating the scheduled transmission; determining an acknowledgment of the DCI based on the scheduled transmission; and switching the control beam for the CORESET based on the TCI after a time offset from the acknowledgment.

The above second example method, wherein the scheduled transmission is at least one physical downlink shared channel (PDSCH) and wherein the acknowledgment of the DCI is an acknowledgment of the at least one PDSCH.

Any of the above second example methods, wherein the at least one PDSCH includes at least two transport blocks and the acknowledgment of the at least one PDSCH is an uplink control information (UCI) bit indicating a positive acknowledgment for at least one of the transport blocks.

Any of the above second example methods, wherein the at least one PDSCH includes multiple code block groups and the acknowledgment is a UCI bit indicating a positive acknowledgment for at least one of the code block groups.

Any of the above second example methods, wherein the acknowledgment is a UCI including bits for multiple PDSCHs and wherein at least one bit corresponding to the PDSCH scheduled by the DCI indicates a positive acknowledgment.

Any of the above second example methods, wherein a hybrid automatic repeat request (HARQ) codebook for the acknowledgment of the at least one PDSCH is one of a Type I, Type II, or TYPE III HARQ codebook.

Any of the above second example methods, wherein the scheduled transmission is a physical uplink shared channel (PUSCH) and the acknowledgment of the DCI is the PUSCH.

Any of the above second example methods, wherein the PUSCH has a different transmission characteristic than any PUSCH for the UE scheduled by a configured grant.

Any of the above second example methods, further comprising transmitting a radio resource configuration message configuring a DCI format of the DCI to include a field for TCI indication.

Any of the above second example methods, wherein the scheduled transmission is one of a physical random access channel (PRACH), sounding reference signal (SRS), or channel state information (CSI) report and the acknowledgment of the DCI is the scheduled transmission.

Any of the above second example methods, wherein the time offset from the acknowledgment is a number of symbols.

Any of the above second example methods, wherein the time offset includes at least one slot for a second DCI to schedule a retransmission of the scheduled transmission when the acknowledgment of the DCI fails.

Any of the above second example methods, wherein the TCI is applicable to a group of physical channels.

Any of the above second example methods, wherein the DCI includes a channel group identifier indicating the group of physical channels.

Any of the above second example methods, wherein the group of physical channels is a group of physical channels including the CORESET on which the DCI is received.

Any of the above second example methods, wherein communicating the scheduled transmission comprises activating a data beam indicated by the TCI for the scheduled transmission.

A first example apparatus for wireless communication, comprising: a memory; and at least one processor coupled to the memory and configured to perform any of the above first example methods.

An second example apparatus for wireless communication, comprising: means for performing any of the above first example methods.

A first example non-transitory computer-readable medium storing computer executable code, the code when executed by a processor cause the processor to perform any of the above first example methods.

A third example apparatus for wireless communication, comprising: a memory; and at least one processor coupled to the memory and configured to perform any of the above second example methods.

A fourth apparatus for wireless communication, comprising: means for performing any of the above second example methods.

A second non-transitory computer-readable medium storing computer executable code, the code when executed by a processor cause the processor to perform any of the above second example methods.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication, comprising:
receiving, at a user equipment (UE) using a control beam for a control resource set (CORESET), a downlink control information (DCI) that includes a transmission configuration indicator (TCI) applicable to a group of physical channels and schedules a transmission between the UE and a base station;
communicating the scheduled transmission;
determining an acknowledgment of the DCI based on the scheduled transmission; and
switching the control beam for the group of physical channels including the CORESET on which the DCI is received based on the TCI after a time offset from the acknowledgment, wherein the time offset from the acknowledgment is a number of symbols.

2. The method of claim 1, wherein the scheduled transmission is at least one physical downlink shared channel (PDSCH) and wherein the acknowledgment of the DCI is an acknowledgment of the at least one PDSCH.

3. The method of claim 2, wherein the at least one PDSCH includes at least two transport blocks and the acknowledgment of the at least one PDSCH is an uplink control information (UCI) bit indicating a positive acknowledgment for at least one of the transport blocks.

4. The method of claim 2, wherein the at least one PDSCH includes multiple code block groups and the acknowledgment is a UCI bit indicating a positive acknowledgment for at least one of the code block groups.

5. The method of claim 2, wherein the acknowledgment is a UCI including bits for multiple PDSCHs and wherein at least one bit corresponding to the PDSCH scheduled by the DCI indicates a positive acknowledgment.

6. The method of claim 2, wherein a hybrid automatic repeat request (HARQ) codebook for the acknowledgment of the at least one PDSCH is one of a Type I, Type II, or TYPE III HARQ codebook.

7. The method of claim 1, wherein the time offset includes at least one slot for a second DCI to schedule a retransmission of the scheduled transmission when the acknowledgment of the DCI fails.

8. The method of claim 1, wherein communicating the scheduled transmission comprises activating a data beam indicated by the TCI for the scheduled transmission.

9. A method of wireless communication, comprising:
transmitting, from a base station using a control beam for a control resource set (CORESET) of a user equipment (UE), a downlink control information (DCI) that includes a transmission configuration indicator (TCI) applicable to a group of physical channels and schedules a transmission between the UE and the base station;
communicating the scheduled transmission;
determining an acknowledgment of the DCI based on the scheduled transmission; and
switching the control beam for the group of physical channels including the CORESET on which the DCI is transmitted based on the TCI after a time offset from the acknowledgment, wherein the time offset from the acknowledgment is a number of symbols.

10. The method of claim 9, wherein the scheduled transmission is at least one physical downlink shared channel (PDSCH) and wherein the acknowledgment of the DCI is an acknowledgment of the at least one PDSCH.

11. The method of claim 10, wherein the at least one PDSCH includes at least two transport blocks and the acknowledgment of the at least one PDSCH is an uplink control information (UCI) bit indicating a positive acknowledgment for at least one of the transport blocks.

12. The method of claim 10, wherein the at least one PDSCH includes multiple code block groups and the acknowledgment is a UCI bit indicating a positive acknowledgment for at least one of the code block groups.

13. The method of claim 10, wherein the acknowledgment is a UCI including bits for multiple PDSCHs and wherein at least one bit corresponding to the PDSCH scheduled by the DCI indicates a positive acknowledgment.

14. The method of claim 10, wherein a hybrid automatic repeat request (HARQ) codebook for the acknowledgment of the at least one PDSCH is one of a Type I, Type II, or TYPE III HARQ codebook.

15. The method of claim 9, wherein the time offset includes at least one slot for a second DCI to schedule a retransmission of the scheduled transmission when the acknowledgment of the DCI fails.

16. The method of claim 9, wherein communicating the scheduled transmission comprises activating a data beam indicated by the TCI for the scheduled transmission.

17. An apparatus of a user equipment (UE) for wireless communication, comprising:
a memory; and
at least one processor coupled to the memory and configured to:
receive, using a control beam for a control resource set (CORESET), a downlink control information (DCI) that includes a transmission configuration indicator (TCI) applicable to a group of physical channels and schedules a transmission between the UE and a base station;
communicate the scheduled transmission;
determine an acknowledgment of the DCI based on the scheduled transmission; and
switch the control beam for the group of physical channels including the CORESET on which the DCI is received based on the TCI after a time offset from the acknowledgment, wherein the time offset from the acknowledgment is a number of symbols.

18. The apparatus of claim 17, wherein the scheduled transmission is at least one physical downlink shared channel (PDSCH) and wherein the acknowledgment of the DCI is an acknowledgment of the at least one PDSCH.

19. The apparatus of claim 18, wherein the at least one PDSCH includes at least two transport blocks and the acknowledgment of the at least one PDSCH is an uplink control information (UCI) bit indicating a positive acknowledgment for at least one of the transport blocks.

20. The apparatus of claim 18, wherein the at least one PDSCH includes multiple code block groups and the acknowledgment is a UCI bit indicating a positive acknowledgment for at least one of the code block groups.

21. The apparatus of claim 18, wherein the acknowledgment is a UCI including bits for multiple PDSCHs and wherein at least one bit corresponding to the PDSCH scheduled by the DCI indicates a positive acknowledgment.

22. The apparatus of claim 18, wherein a hybrid automatic repeat request (HARQ) codebook for the acknowledgment of the at least one PDSCH is one of a Type I, Type II, or TYPE III HARQ codebook.

23. The apparatus of claim 17, wherein the time offset includes at least one slot for a second DCI to schedule a retransmission of the scheduled transmission when the acknowledgment of the DCI fails.

24. An apparatus of a base station for wireless communication, comprising:
a memory; and
at least one processor coupled to the memory and configured to:
transmit, using a control beam for a control resource set (CORESET) of a user equipment (UE), a downlink control information (DCI) that includes a transmission configuration indicator (TCI) applicable to a group of physical channels and schedules a transmission between the UE and the base station;
communicate the scheduled transmission;
determine an acknowledgment of the DCI based on the scheduled transmission; and
switch the control beam for the group of physical channels including the CORESET on which the DCI is transmitted based on the TCI after a time offset from the acknowledgment, wherein the time offset from the acknowledgment is a number of symbols.

* * * * *